US012576397B2

(12) United States Patent (10) Patent No.: US 12,576,397 B2
Morozan et al. (45) Date of Patent: Mar. 17, 2026

(54) (BI)METAL SULFIDE POLYMER COMPOSITE MATERIAL, AND ITS USE AS CATALYST FOR HYDROGEN PRODUCTION

(71) Applicants: TOYOTA MOTOR EUROPE, Brussels (BE); COMMISSARIAT À L'ENERGIE ATOMIQUE ET AUX ENERGIES ALTERNATIVES, Paris (FR); CENTRE NATIONAL DE LA RECHERCHE SCIENTIFIQUE, Paris (FR)

(72) Inventors: Adina Morozan, Grenoble (FR); Hannah Johnson, Brussels (BE); Sachin Kinge, Brussels (BE); Vincent Artero, Quaix-en-Chartreuse (FR)

(73) Assignees: Toyota Motor Europe, Brussels (BE); COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 552 days.

(21) Appl. No.: 17/922,515

(22) PCT Filed: Apr. 28, 2021

(86) PCT No.: PCT/EP2021/061200
§ 371 (c)(1),
(2) Date: Oct. 31, 2022

(87) PCT Pub. No.: WO2021/219759
PCT Pub. Date: Nov. 4, 2021

(65) Prior Publication Data
US 2023/0173471 A1 Jun. 8, 2023

(30) Foreign Application Priority Data

Apr. 29, 2020 (WO) ................. PCT/EP2020/061969

(51) Int. Cl.
*B01J 27/047* (2006.01)
*B01J 37/04* (2006.01)
(Continued)

(52) U.S. Cl.
CPC ............. *B01J 27/047* (2013.01); *B01J 37/04* (2013.01); *B01J 37/06* (2013.01); *B01J 37/08* (2013.01);
(Continued)

(58) Field of Classification Search
CPC . B01J 27/047; B01J 37/04; B01J 37/06; B01J 37/08; B01J 37/12; C08K 3/30;
(Continued)

(56) References Cited

U.S. PATENT DOCUMENTS 6,599,631 B2 * 7/2003 Kambe .................. G02B 1/005
524/588
2014/0225041 A1 * 8/2014 Archer .................... C01B 32/00
252/503

FOREIGN PATENT DOCUMENTS

JP 2011-077044 A 4/2011

OTHER PUBLICATIONS

"Initial photooxidation mechanism leading to reactive radical formation of polythiophene derivatives" (Year: 2015).*
(Continued)

*Primary Examiner* — Paul A Wartalowicz
*Assistant Examiner* — Slone Elizabeth Simkins
(74) *Attorney, Agent, or Firm* — Oliff PLC

(57) ABSTRACT

A composite material made of an amorphous (bi)metal sulfide nanoparticles directly linked, through coordinate
(Continued)

as synthesized a-MoSₓ

Operative conditions
polymer-stabilized

Reductive corrosion

Operative conditions

* active site
/ coordinating function in polymer covalent bonds, to a sulfur-containing polymer and a method of preparation of the composite material. The composite material can also be used as a catalyst for hydrogen production. Finally, a proton-exchange membrane (PEM) electrolyser and a photoelectrochemical cell, can both including the composite material.

22 Claims, 24 Drawing Sheets

(51) Int. Cl.

| | |
|---|---|
| B01J 37/06 | (2006.01) |
| B01J 37/08 | (2006.01) |
| B01J 37/12 | (2006.01) |
| C08G 61/12 | (2006.01) |
| C08K 3/30 | (2006.01) |
| C08K 5/45 | (2006.01) |
| C08L 81/00 | (2006.01) |
| C25B 1/02 | (2006.01) |
| C25B 1/04 | (2021.01) |
| C25B 1/55 | (2021.01) |
| C25B 9/23 | (2021.01) |
| C25B 9/50 | (2021.01) |
| C25B 11/054 | (2021.01) |
| C25B 11/065 | (2021.01) |
| C25B 11/095 | (2021.01) |
| C25B 13/04 | (2021.01) |

(52) U.S. Cl.
CPC .................. *B01J 37/12* (2013.01); *C08K 3/30* (2013.01); *C08K 5/45* (2013.01); *C08L 81/00* (2013.01); *C25B 1/02* (2013.01); *C25B 1/55* (2021.01); *C25B 13/04* (2013.01); *C08K 2003/3009* (2013.01)

(58) Field of Classification Search
CPC ... C08K 5/45; C08K 2003/3009; C08L 81/00; C25B 1/02; C25B 1/55; C25B 13/04; C25B 9/23; C25B 9/50; C25B 11/054; C25B 11/065; C25B 11/095; C25B 1/04; Y02E 60/36; Y02P 20/133; C08G 2261/1412; C08G 2261/3223; C08G 2261/964; C08G 61/126
See application file for complete search history.

(56) References Cited

OTHER PUBLICATIONS

"Synthesis of Pt—Pd bimetallic nanoparticles anchored on graphene for highly active methanol electro-oxidation" (Year: 2014).*

Wang, Tanyuan et al. "Electrochemically Fabricated Polypyrrole and MoSx Copolymer Films as a Highly Active Hydrogen Evolution Electrocatalyst". Advanced Materials, 2014, vol. 26, pp. 3761-3766.

Chaudhary, Vivek et al. "MoS2 Assisted Self-Assembled Poly (3-hexylthiophene) Thin Films at an Air/Liquid Interface for High-Performance Field-Effect Transistors under Ambient Conditions". The Journal of Physical Chemistry C, 2020, vol. 124, pp. 8101-8109.

Bourgeteau, Tiphaine et al. "A H2-evolving photocathode based on direct sensitization of MoS3 with an organic photovoltaic cell". Energy & Environmental Science, 2013, vol. 6, pp. 2706-2713.

Zeng, Xianwen et al. "Effect of Polymer Addition on the Structure and Hydrogen Evolution Reaction Property of Nanoflower-Like Molybdenum Disulfide". Metals, 2015, vol. 5, pp. 1829-1844.

Jul. 1, 2021 International Search Report issued in International Patent Application No. PCT/EP2021/061200.

Jul. 1, 2010 Written Opinion of the International Searching Authority issued in International Patent Application No. PCT/EP2021/061200.

Lattach, Youssef et al. "Polypyrrole-Ru(2,2'-bipyridine)3 2+/MoSx Structured Composite Film As a Photocathode for the Hydrogen Evolution Reaction". ACS Applied Materials & Interfaces, 2015, vol. 7, pp. 4476-4480.

Bourgeteau, Tiphaine et al. "Enhancing the Performances of P3HT:PCBM-MoS3-Based H2-Evolving Photocathodes with Interfacial Layers". ACS Applied Materials & Interfaces, 2015, vol. 7, 16395-16403.

Bourgeteau, T. et al. "All solution-processed organic photocathodes with increased efficiency and stability via the tuning of the hole-extracting layer". Journal of Materials Chemistry A, 2016, vol. 4, pp. 4831-4839.

Morozan, A et al. "Noble metal-free hydrogen-evolving photocathodes based on small molecule organic semiconductors". Nanotechnology, 2016, vol. 27, pp. 355401-355408.

Ji, Zhe et al. "Linking Molybdenum—Sulfur Clusters for Electrocatalytic Hydrogen Evolution". Journal of the American Chemical Society, 2018, vol. 140, pp. 13618-13622.

Staszak-Jirkovsky, Jakub et al. "Design of active and stable Co—Mo—Sx chalcogels as pH-universal catalysts for the hydrogen evolution reaction". Nature Materials, Feb. 2016, vol. 15, pp. 197-204.

Tran, Phong D. et al. "Copper molybdenum sulfide: a new efficient electrocatalyst for hydrogen production from water". Energy & Environmental Science, 2012, vol. 5, pp. 8912-8916.

Tran, Phong D. et al. "Novel cobalt/nickel-tungsten-sulfide catalysts for electrocatalytic hydrogen generation from water". Energy & Environmental Science, 2013, vol. 6, pp. 2452-2459.

Shim, Yurina et al. "Tunable Biomimetic Chalcogels with Fe4S4 Cores and [SnnS2n+2]4-(n=1, 2, 4) Building Blocks for Solar Fuel Catalysis". Journal of the American Chemical Society, 2013, vol. 135, pp. 2330-2337.

Tran, Phong D. et al. "Coordination polymer structure and revisited hydrogen evolution catalytic mechanism for amorphous molybdenum sulfide". Nature Materials, Jun. 2016, vol. 15, pp. 640-647.

Morozan, Adina et al. "Nonprecious Bimetallic Iron-Molybdenum Sulfide Electrocatalysts for the Hydrogen Evolution Reaction in Proton Exchange Membrane Electrolyzers". ACS Catalysis, 2020, vol. 10, pp. 14336-14348.

Wang, Mingyong et al. "The intensification technologies to water electrolysis for hydrogen production—A review". Renewable and Sustainable Energy Reviews, 2014, vol. 29, pp. 573-588.

Sun, Xinwei et al. "Earth-Abundant Electrocatalysts in Proton Exchange Membrane Electrolyzers". Catalysts, 2018, vol. 8, 657, pp. 1-41.

Walter, Michael G. et al. "Solar Water Splitting Cells". Chemical Reviews, 2010, vol. 110, No. 11, pp. 6646-6473.

Le Goff, Alan et al. "From Hydrogenases to Noble Metal-Free Catalytic Nonomaterials for H2 Production and Uptake". Science, Dec. 4, 2009, New Series, vol. 326, No. 5958, pp. 1384-1387.

Lukaszewski, M. et al. "Electrochemical Methods of Real Surface Area Determination of Noble Metal Electrodes—an Overview". International Journal of Electrochemical Science, 2016, vol. 11, pp. 4442-4469.

Di Giovanni, Carlo et al. "Low-Cost Nanostructured Iron Sulfide Electrocatalysts for PEM Water Electrolysis". ACS Catalysis, 2016, vol. 6, pp. 2626-2631.

Jun. 25, 2024 Office Action issued in Japanese Patent Application No. 2022-566276.

Bourgeteau et al.; "A H2-evolving photocathoded based on direct sensitization of MoS3 with an organic photovoltaic cell;" Energy & Environmental Science; 2013; pp. 2706-2713; vol. 6.

Dec. 19, 2023 Office Action issued in Japanese Patent Application No. 2022-566276.

* cited by examiner

(BI)METAL SULFIDE POLYMER COMPOSITE MATERIAL, AND ITS USE AS CATALYST FOR HYDROGEN PRODUCTION

FIELD OF THE INVENTION

The present invention relates to a composite polymer material made of a sulfur-containing polymer able to bind metal sites through sulfur atoms (or sulfur-based ligating sites) and amorphous (bi)metal sulfide nanoparticles. The invention also relates to a method of preparation of a composite material according to the invention. The use of a composite material according to the invention as a catalyst for hydrogen production is also part of the invention. Finally, the invention concerns a proton-exchange membrane (PEM) electrolyser and a photoelectrochemical cell, both comprising a composite material according to the invention.

INFORMATION ACKNOWLEDGING SUPPORT FOR RESEARCH

The project leading to the present patent application has received funding from the European Research Council (ERC) under the European Union's Horizon 2020 research and innovation programme (grant agreement No 836429).

TECHNOLOGICAL BACKGROUND

Metal sulfides such as molybdenum sulfides are very attractive noble-metal-free electrocatalysts for the hydrogen evolution reaction (HER) from water. For example, HER-active for amorphous molybdenum sulfide (a-MoS$_x$), prepared either as nanoparticles or as films, is a molecular-based coordination polymer consisting of discrete [Mo$_3$S$_7$]$^{4+}$ clusters, hereafter named [Mo]$_3$ clusters, linked by disulfide (S$_2^{2-}$) anions to other clusters. Such a molecular structure explains some of the special properties of a-MoS$_x$, such as its catalytic activity, reductive activation and corrosion. In some clusters, disulfide (S$_2^{2-}$), oxo (O$^{2-}$) or sulfido (S$_2$-) ligands remain unshared and are designed as terminal ligands. Under reductive aqueous conditions, these terminal ligands are displaced which allows molybdenum hydride moieties to form as the active site for H$_2$ evolution. These HER electrocatalysts are therefore of considerable interest as far as they appear as an alternative to platinum. Indeed, Pt-based catalysts suffer of being both scarce and expensive despite their high performance and stability.

Scalable renewable hydrogen production via solar-driven water splitting employing a viable and cost-effective (photo) electrochemical device or electrochemical device coupled with a photovoltaic is a potential technology to address the global demand for renewable energy. To this end, the search for efficient electrocatalysts based on non-precious metals for the oxygen evolution reaction (OER) and the HER has progressed. In particular, in the past few years, significant advances have been achieved to identify HER electrocatalysts alternative to platinum and based on transition metals such as Fe, Ni, Co, Mo or W. Indeed, considering the scale-up towards large scale a hydrogen production, Pt-based catalyst alternatives, more abundant, must be sought. Molybdenum sulfide, as well as other metal sulphides is one of the most promising candidates to replace platinum due to its high performance. Amongst other, crystalline molybdenum disulfide (c-MoS$_2$), amorphous molybdenum sulfide (a-MoS$_x$), and molybdenum sulfido clusters, such as [Mo$_3$S$_4$]$^{4+}$, [Mo$_3$S$_{13}$]$^{2-}$, or [Mo$_2$S$_{12}$]$^{2-}$, have recently gained attention thanks to their scalable preparation methods, attractive catalytic activities and robustness, as well as their capability to be integrated in H$_2$-evolving photocathodes (Y. Lattach et al., ACS Appl. Mater. Interfaces 2015, 7, 4476-4480; T. Bourgeteau et al. B. ACS Appl. Mater. Interfaces 2015, 7, 16395-16403; T. Bourgeteau et al., B. Energy Environ. Sci. 2013, 6, 2706-2713; T. Bourgeteau et al., B. J. Mater. Chem. A 2016, 4, 4831-4839; A. Morozan et al., Nanotechnology 2016, 27, 355401). Other metal sulfides comprising linkers between clusters, such as dithiolate ligands (Ji et al. J. Am. Chem. Soc. 2018, 140, 13618-13622) or amorphous molydebum/tungsten sulfides mixes with other metal ions such as Co, Cu, Fe and Ni (Staszak-Jirkovsky et al. Nat. Mater. 2016, 15, 197; Tran et al. Energy Environ. Sci. 2012, 5, 8912-8916; Di Giovanni et al. ACS Catal. 2016, 6, 2626-2631; Tran et al. Energy. Environ. Sci. 2013, 6, 2452-2459; Shim et al. J. Am. Chem. Soc. 2013, 135, 2330-2337) have also demonstrated their interest.

P. D. Tran et al. (Nature Materials, 2016, volume 15, pages 640-646) studied the structure and reactivity of a-MoS$_x$. They reported that the polymeric structure and molecular nature of a-MoS$_x$, which can be formulated as a coordination polymer based on [Mo$_3$S$_{13}$]$^{2-}$ clusters sharing disulfide ligands (in other words, [Mo]$_3$ clusters linked by disulfide (S$_2^{2-}$) anions), leads to catalytic centers for proton reduction. Reducing and/or eliminating the terminal disulfide ligands forms unsaturated Mo$^{IV}$ sites on the [Mo]$_3$ clusters. Proton-coupled reduction of these sites then generates the active centers for H$_2$ evolution However, the low stability, especially towards oxygen, prevents metal sulfides such as molybdenum sulfide catalysts from being widely used today in commercial electrolysers. Regarding amorphous molybdenum sulfide, the lack of stability comes from the reductive detachment of [Mo]$_3$ clusters from the chain structure, with concomitant generation of H$_2$S, causing a reduction in the number of active sites. Once these catalyst units have detached and are dissolved into the electrolyte solution, they are no longer active and, over time, the catalytic activity decreases.

Another drawback of amorphous metal sulfides such as amorphous molybdenum sulfide as a catalyst lies in the higher overpotential (or driving force) required to achieve H$_2$ evolution at a significant rate compared to platinum. This property may be quantified thanks to the OP$_{10\,mAcm-2}$ value, which is the overpotential (i.e. the difference between the operating potential and the equilibrium potential of the H$^+$/H$_2$ couple) measured when the catalyst operates at 10 mA·cm$^{-2}$.

Therefore, solutions are still needed to avoid or control reductive corrosion of amorphous metal sulfide materials, together with rational optimization of their catalytic performances, through synthetic modifications of the cluster units and/or the connecting ligands.

SUMMARY OF THE INVENTION

It has now been found that a composite material made of a sulfur-containing polymer directly linked through coordinate covalent bonds to amorphous (bi)metal sulfide, and in particular to amorphous molybdenum sulfide (a-MoS$_x$), can act as a competitive hydrogen generating catalyst and provides a cost-effective alternative to existing Pt-based electrocatalysts, whilst showing enhanced oxygen stability. The proposed composite material of the invention has also increased electrochemical performances for catalytic H$_2$ evolution compared to pure amorphous metal sulfide.

Photoelectrochemical cells combining a noble-metal-free amorphous $MoS_3$ particles and P3HT:PCBM were studied by T. Bourgeteau et al. (Energy Environ. Sci. 2013, 6, 2706-2713; ACS Appl. Mater. Interfaces, 2015, 7, 16395-16403; J. Mater. Chem. A 2016, 4, 4831-4839). In these studies, there is no intimate mixing between P3HT and amorphous $MoS_3$ particles. Importantly, the $MoS_3$ particles that are active for $H_2$ evolution are those in contact with the PCBM n-type phase of the P3HT:PCBM p/n solar cell. This point is confirmed in the studies by the investigation of different interfacial layers likely to enhance the charge transfer between P3HT:PCBM and amorphous $MoS_3$ particles in photoelectrochemical cells. In such cells, the interfacial layer, located between the metal $MoS_3$ and the P3HT: PCBM polymer, prevented direct contact between $MoS_3$ and P3HT:PCBM.

Two-dimensional nanosheets of crystalline $MoS_2$ have also been used to organize layers of P3HT and fabricate highly ordered and long fibrillary structures of $P3HT/MoS_2$ nanocomposite (Chaudhary et al. J. Phys. Chem. C 2020, 124, 8101-8109). The formation of this nanocomposite is due to n-n stacking interactions between $MoS_2$ and P3HT. Of note all the Mo ions present in the basal plane of $c-MoS_2$ are coordinatively saturated and cannot undergo any coordinate covalent bonding.

In the composite material of the invention, the Inventors have observed that the direct contact, through intimate binding, between sulfur-containing polymer and amorphous (bi)metal sulfide nanoparticles improves the stability of the obtained material, in particular the stability towards oxygen. This is due to the fact that the sulfur-containing polymer with sulfur-based coordinating sites binds the clusters of the amorphous (bi)metal sulfide, such as the $[Mo]_3$ clusters of amorphous molybdenum sulfide, and acts as an exoskeleton of the amorphous (bi)metal sulfide structure, thus preventing the clusters from detaching and dissolving into the electrolyte, and maintaining the number of active sites unchanged, as illustrated in FIG. 1 for amorphous molybdenum sulfide. In addition, the sulfur-containing polymer holds the clusters in close proximity, allowing the disulfide bonding between the clusters of the amorphous (bi)metal sulfide nanoparticles to be easily reformed even when bonds become detached. It also appears that, in presence of oxygen ($O_2$), the sulfur-containing polymer protects the clusters of the amorphous (bi)metal sulfide nanoparticles against degradation.

SUMMARY OF THE INVENTION

Therefore, in a first aspect, the present invention aims at a composite material comprising amorphous (bi)metal sulfide nanoparticles directly linked through coordinate covalent bonds to a sulfur-containing polymer.

In another aspect, the invention relates to a process for the preparation of a composite material according to the invention, comprising a step or preparation of amorphous (bi) metal sulfide nanoparticles, preferably by oxidation-reduction reaction step, and then dispersing in and reacting the obtained amorphous (bi)metal sulfide nanoparticles with a sulfur-containing polymer.

The invention also relates to the use of a composite material according to the invention as a catalyst for hydrogen production.

Finally, the invention concerns electrochemical devices, for example but not limited to, proton-exchange membrane (PEM) electrolysers and photoelectrochemical cells, both comprising a composite material in the (photo)cathode department according to the invention.

DETAILED DESCRIPTION OF THE INVENTION

Figure 1:
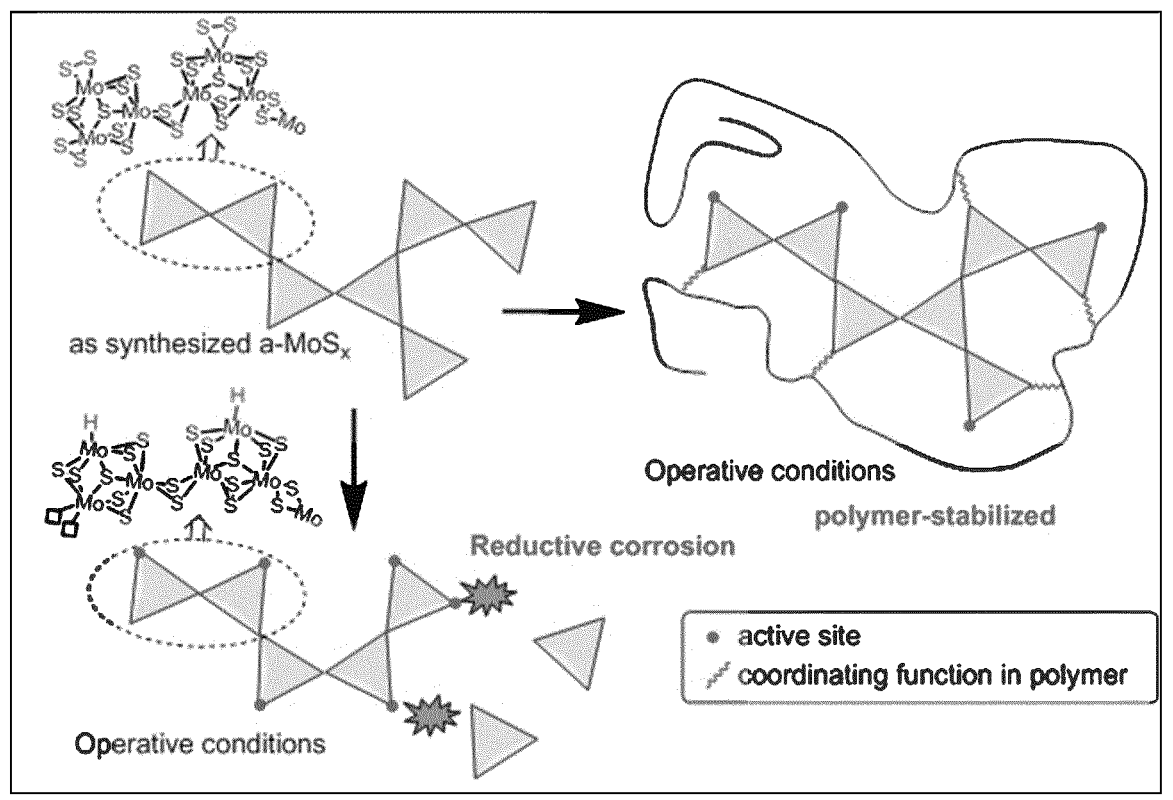
FIG. 1 illustrates the composite structure of a catalyst according to the invention showing amorphous molybdenum sulfide ($a-MoS_x$) based on $[Mo]_3$ clusters stabilized by a sulfur-based coordinating functions.

The present invention relates to a composite material made of:
  amorphous (bi)metal sulfide nanoparticles based on amorphous (bi)metal sulfide clusters, directly linked, through coordinate covalent bonds, to
  a sulfur-containing polymer.

In the sense of the invention, amorphous (bi)metal sulfide nanoparticles encompasses amorphous single-metal sulfide nanoparticles and amorphous bi-metal sulfide nanoparticles. Therefore, according to a first embodiment, the amorphous (bi)metal sulfide nanoparticles are amorphous single-metal sulfide nanoparticles. According to a second embodiment, the amorphous (bi)metal sulfide nanoparticles amorphous bi-metal sulfide nanoparticles, wherein the metals of the amorphous bi-metal sulfide are different.

The metal(s) of the amorphous (bi)metal sulfide nanoparticles of the invention may be advantageously chosen in the group consisting of metal of the columns 5 and 6 of the periodic table (table of Mendeleiev), optionally combined (when the amorphous (bi)metal sulfide is an amorphous bi-metal sulfide) with another element chosen in the group consisting of the columns 4 to 11 of the periodic table. In a preferred embodiment, the metal(s) of the amorphous (bi) metal sulfide nanoparticles of the invention is chosen in the group consisting of Mo, V, and W, optionally in combination with (when the amorphous (bi)metal sulfide is an amorphous bi-metal sulfide) another element preferably chosen in the group consisting of Mo, V, W, Ti, Cr, Mn, Fe, Co, Ni, Cu, Nb, Ta. In a yet preferred embodiment, the metal(s) of the amorphous (bi)metal sulfide nanoparticles of the invention is chosen in the group consisting of Mo and W, optionally in combination with (when the amorphous (bi)metal sulfide is an amorphous bi-metal sulfide) another element preferably chosen in the group consisting of Mo, W, Fe, Co.

When the amorphous (bi)metal sulfide is an amorphous bi-metal sulfide, wherein the metals of the amorphous bi-metal sulfide nanoparticles are different, it is advantageously chosen in the group consisting of Mo, V, and W, combined with another element chosen in the group consisting of Mo, V, W, Ti, Cr, Mn, Fe, Co, Ni, Cu, Nb, Ta. In a preferred embodiment, it is advantageously chosen in the group consisting of Mo and W, combined with another element chosen in the group consisting of Mo, W, Fe, Co, when the metals of the amorphous bi-metal sulfide nanoparticles are different. In a preferred embodiment, the amorphous bi-metal sulfide nanoparticles are chosen in the group consisting of $a\text{-}CoMoS_x$, $a\text{-}FeMoS_x$, and $a\text{-}CoWS_x$ nanoparticles.

In a particularly preferred embodiment, the metal of the amorphous (bi)metal sulfide of the invention is Mo and, in such embodiment, the invention relates to a composite material made of:
  amorphous molybdenum sulfide nanoparticles based on $[Mo]_3$ clusters (as building units) linked by disulfide $(S_2^{2-})$ anions, the $[Mo]_3$ clusters being directly linked, through coordinate covalent bonds, to
  a sulfur-containing polymer.

The composite material of the invention has the main advantage of being a hydrogen generating catalyst with increased electrochemical performances and enhanced stability towards oxygen compared to amorphous metal sulfide.

In the composite material of the invention, the amorphous (bi)metal sulfide nanoparticles are in direct contact with the sulfur-containing polymer through coordinate covalent bonds between the sulfur atoms of the sulfur-containing polymer and the metal ions of the amorphous (bi)metal sulfide. The amorphous (bi)metal sulfide is therefore intimately connected to the sulfur-containing polymer. In other word, the composite material of the invention does not comprise any intermediate layer between the amorphous (bi)metal sulfide and the sulfur-containing polymer.

In the sense of the invention, a coordinate covalent bond is a 2-center, 2-electron covalent bond in which the two electrons derive from the same atom. A coordinate covalent bond is characteristic of bonding between metal ions and ligands.

In the composite material of the invention, the sulfur-containing polymer may be chosen in the group consisting of polythiophene such as poly(3-hexylthiophene-2,5-diyl) (P3HT), poly(ethylenedioxythiophene) such as poly(3,4-ethylenedioxythiophene) (PEDOT), poly(arylene thioether) such as polyphenylene sulfide, and mixtures thereof.

In a preferred embodiment, the sulfur-containing polymer is poly(3-hexylthiophene-2,5-diyl) (P3HT).

The sulfur-containing polymer of the invention may have a number average molecular weight Mn ranging from 5,000 to 100,000 g·mol$^{-1}$.

In the composite material of the invention, the amorphous (bi)metal sulfide nanoparticles are based on (bi)metal sulfide clusters and may be considered as a coordination polymer of (bi)metal sulfide clusters. A nanoparticle according to the invention is made of several clusters, preferably a group of 2 to 40 clusters, linked together to form a molecular-based coordination polymer. Therefore, the number of (bi)metal sulfide clusters in one chain of amorphous (bi)metal sulfide may range from 2 to 40. In the specific embodiment of amorphous molybdenum sulfide, the latter is based on $[Mo]_3$ clusters and may be considered as a polymer of $[Mo]_3$ clusters. Typically, in this case, the number of $[Mo]_3$ clusters in one chain of amorphous molybdenum sulfide may range from 2 to 30, and preferably 2 to 20, although longer polymer of $[Mo]_3$ clusters cannot be excluded.

The size of an amorphous (bi)metal sulfide cluster may advantageously range from 0.1 to 2 nm, and preferably from 0.2 to 1.5 nm. The size of the amorphous (bi)metal sulfide cluster is a number-based particle size Dn,90 (also named number-based particle diameter Dn,90). The size of the amorphous (bi)metal sulfide cluster can be measured by Scanning Transmission Electron Microscopy (STEM), for example with a JEM-ARM200F NEOARM Atomic Resolution Analytical Electron Microscope. More specifically, the size of the amorphous (bi)metal sulfide cluster can be measured by High-Angle Annular Dark-Field Scanning Transmission Electron Microscopy (HAADF-STEM). In a particularly preferred embodiment, when the amorphous (bi)metal sulfide cluster is a $[Mo]_3$ molybdenum sulfide cluster, the size of the $[Mo]_3$ molybdenum sulfide cluster is of about 0.3 nm. In this case, the structure of a-$MoS_x$ may be investigated by Scanning Transmission Electron Microscopy (STEM), as described in Nature Materials, vol. 15, pages 640-646 (2016), by using graphite flakes (GF) of high surface area (Alfa Aesar) as carbon support for soft-landings of the clusters. Prior to be used, GF can be activated by electrochemical anodization in a $H_2SO_4$ solution (0.5 mol·L⁻¹) at a potential of 1.0 V vs. Ag/AgCl for 3 minutes. 5 mL suspension of $5 \times 10^{-3}$ (wt %) a-$MoS_x$ in methanol can be mixed with 50 mg of GF by continuous stirring. Methanol can then be evaporated under vacuum. The resulted sample with sub-monolayer coverage of a-$MoS_x$ on the GF surface can then be observed by High Angle Annular Dark-Field (HAADF) imaging.

As regards the size of the composite material of the invention, the latter advantageously ranges from 1 to 100 nm. The size of the composite material of the invention is a number-based particle size Dn,90 (also named number-based particle diameter Dn,90). The size of the composite material can be measured by Scanning Electron Microscopy (SEM) (for example with a ZEISS Ultra-55 Scanning Electron Microscope) or Transmission Electron Microscopy (TEM) (for example with a Cs-probe corrected FEI Titan Themis Transmission Electron Microscope). More specifically, the size of the composite material can be measured by High-Angle Annular Dark-Field Scanning Transmission Electron Microscopy (HAADF-STEM). In this case, a catalyst suspension in ethanol can be prepared by ultrasonic homogenization and then drop-cast on an ultrathin carbon film on a Cu grid, as described in ACS Catalysis, 2020, 10, 14336-14348. The resulted sample can then be observed by HAADF-STEM and the corresponding energy-dispersive spectroscopy (EDS) elemental mapping analyses with an FEI-Osiris microscope (operated for example at 200 kV).

In the composite material of the invention, the amount of metal in the amorphous (bi)metal sulfide nanoparticles may represent from 20 to 75 wt %, and preferably from 30 to 60 wt %. In a particularly preferred embodiment, when the amorphous (bi)metal sulfide nanoparticles are amorphous molybdenum sulfide nanoparticles, the amount of Mo in the amorphous molybdenum sulfide nanoparticles may represent from 30 to 45 wt %, preferably from 32 to 40 wt %, and more preferably of about 36 wt %.

In the composite material of the invention, the amount of S in the amorphous (bi)metal sulfide nanoparticles may represent from 25 to 80 wt %, and preferably from 40 to 60 wt %. In a particularly preferred embodiment, when the amorphous (bi)metal sulfide nanoparticles are amorphous molybdenum sulfide nanoparticles, the amount of S in the amorphous molybdenum sulfide nanoparticles may represent from 40 to 60 wt %, preferably from 45 to 55 wt %, and more preferably of about 50 wt %.

In the composite material of the invention, the amorphous (bi)metal sulfide nanoparticles may also comprise oxygen, preferably in an amount ranging from 1 to 30 wt %, and more preferably from 2 to 20 wt %. In a particularly preferred embodiment, when the amorphous (bi)metal sulfide nanoparticles are amorphous molybdenum sulfide nanoparticles, the amorphous molybdenum sulfide nanoparticles may also comprise oxygen, preferably in an amount ranging from 2 to 20 wt %, more preferably from 5 to 15 wt %, and even more preferably of about 14 wt %.

In the composite material of the invention, the mass ratio between the amorphous (bi)metal sulfide nanoparticles and the sulfur-containing polymer may range from 1:1 and 100:1, preferably from 1:1 and 50:1, more preferably from 1:1 and 45:1, and even more preferably from 25:1 and 45:1.

In the composite material of the invention, the mass ratio between the sulfur-containing polymer and the whole composite material of the invention may range from 0.50 and 0.98, and preferably from 0.60 and 0.90.

In another aspect, the invention provides a process for the preparation of a composite material according to the invention, said process comprising the steps of:

(i) preparing amorphous (bi)metal sulfide nanoparticles, preferably by oxidation-reduction reaction; and (ii) under stirring, dispersing the amorphous (bi)metal sulfide obtained in step (i) in a solution of a sulfur-containing polymer, in order to form coordinate covalent bonds between the sulfur-containing polymer and the metal ions of the amorphous (bi)metal sulfide nanoparticles obtained in step (i).

The amorphous (bi)metal sulfide nanoparticles and the sulfur-containing polymer are as defined above for the composite material of the invention.

Step (i) can be carried out by reaction of a metal salt with a sulfur-containing compound, preferably with a compound bearing a thiourea group, and more preferably with thiourea, ethylene thiourea, propylene thiourea, thioacetamide, thioacetic acid, or mixtures thereof, and then heating the resulting mixture. The heating is advantageously performed in a microwave oven with an irradiation power to maintain the temperature of the reaction medium from 200 to 300° C., and preferably from 230 to 270° C., and to maintain the pressure of the reaction medium from 6 to 10 bar, and preferably from 7 to 9 bar. For example, the irradiation power may advantageously vary from 0 to 300 W for 100 mg scale synthesis of amorphous (bi)metal sulfide. The heating by irradiation can be performed in a Discover Microwave Synthesizer (CEM Corporation).

Alternatively, step (i) can be carried out by oxidation-reduction reaction of thiometallate ions, even more preferably by oxidation-reduction reaction of thiometallate ions with an oxidizing agent, and even more preferably by oxidation-reduction reaction of ammonium thiometallate with an oxidizing agent.

In step (i) of the process of the invention, when the amorphous (bi)metal sulfide nanoparticles are prepared by oxidation-reduction reaction of thiometallate ions with an oxidizing agent, the thiometallate ions may be oxidized by the addition of an oxidizing agent chosen in the group consisting of sodium persulfate, potassium persulfate, sodium permanganate, potassium permanganate, sodium dichromate, potassium dichromate, ceric nitrate. In a preferred embodiment, the oxidizing agent used in step (i) for preparing the amorphous (bi)metal sulfide nanoparticles is sodium persulfate.

In a particularly preferred embodiment, when the amorphous (bi)metal sulfide nanoparticles are amorphous molybdenum sulfide nanoparticles, $[MoS_4](NH_4)_2$ is advantageously used as a thiometallate salt to undergo the oxidation-reduction reaction during step (i) for obtaining amorphous molybdenum sulfide nanoparticles.

Step (i) of the present invention is advantageously carried out under stirring and under argon, during at least 30 minutes, more advantageously during 1 to 5 hours, and even more advantageously during 2 hours.

At the end of step (i), the amorphous (bi)metal sulfide nanoparticles obtained may be washed preferably with a solvent chosen in the group consisting of water, diethyl ether, alcohols in $C_1$-$C_6$ such as methanol, ethanol, isopropanol, and their mixtures, and dried under vacuum until the solvent is removed, before step (ii).

Then, the solution of sulfur-containing polymer used in step (ii) of the process of the invention may comprise a sulfur-containing polymer dissolved in a solvent chosen in the group consisting of water, 1,2-dichlorobenzene, dichloromethane, chloroform, 1,1,2,2-tetrachloroethane, 1,2,3-trichloropropane, chlorobenzene, and their mixtures. In a preferred embodiment, the sulfur-containing polymer is dissolved in 1,2-dichlorobenzene.

The concentration of the solution of sulfur-containing polymer implemented in step (ii) may vary from 0.05 to 1 mg·mL$^{-1}$.

Step (ii) of the present invention is advantageously carried out under stirring during at least 10 hours, preferably during 24 to 72 hours, and more preferably during 48 hours.

The process of the invention may further comprise a step (iii) of washing the composite material obtained at the end of step (ii) with a solvent chosen in the group consisting of water, diethyl ether, alcohols in $C_1$-$C_6$ such as methanol, ethanol, isopropanol, and their mixtures, and preferably ethanol.

The process of the invention may further comprise a step (iv) of drying under vacuum the composite material obtained at the end of step (i) or (iii), until the solvent is removed.

In a third aspect, the present invention concerns the use of a composite material according to the invention as a catalyst, and preferably as an electrocatalyst, for hydrogen ($H_2$) production. Specifically, the composite of the invention may be used for HER.

In a preferred embodiment, the composite material of the invention is used as a HER catalyst in an electrochemical cell (Wang et al. Renewable and Sustainable Energy Reviews 2014, 29, 573), and more preferably:

in a proton-exchange membrane (PEM) water electrolyser comprising electrically connected anode and cathode separated by an ionic conductive membrane and an ionic conductive electrolyte (Sun et al. Catalysts 2018, 8, 657), or in a photoelectrochemical cell, advantageously for water splitting, that may comprise an electrically connected (photo)anode and/or (photo)cathode separated by an ionic conductive membrane and an ionic conductive electrolyte (Walter et al. Chem. Rev. 2010, 110, 6446-6473).

In one aspect, the present invention also concerns a proton-exchange membrane (PEM) electrolyser comprising a composite material according to the invention.

Electrolysers are electrochemical devices that use an electric current to provide energy that splits a molecule of water ($H_2O$) into hydrogen ($H_2$) and oxygen ($O_2$). An electrolyser consists of an anode, a cathode and an electrolyte. A PEM electrolyser uses a proton conductive solid polymer (e.g. Nafion®).

A PEM electrolyser according to the invention consists of two external conductive plates and two grooved plates (from carbon at the cathode side and from titanium at the anode side). These grooved plates with machined serpentine flow field on the working area facilitate the flow of water and produced gases ($H_2$ and $O_2$). A membrane-electrode assembly (MEA) was sandwiched between the two grooved plates and clamped together with conductive plates using nuts and bolts. The cell was assembled with polytetrafluoroethylene (PTFE) gaskets. The MEA may be prepared, for example using Nafion® NRE-212 membrane (50 µm thick) as polymer electrolyte membrane, a water oxidation catalyst and a titanium grid on one side forming the anode and a hydrogen evolution catalyst (i.e. the composite material of the invention) deposited on a gas diffusion layer forming the cathode on the other side. The gas diffusion layer is a porous layer made of carbon fibers. It may be coated with a microporous layer usually made of PTFE and carbon black on the side where the catalyst is deposited. When potential difference (voltage) is applied between the two electrodes (anode and cathode) via the conductive plates, water is oxidized at the anode to make protons, electrons, and $O_2$, which escapes through the titanium grid. The protons ($H^+$) travel through the polymer electrolyte towards the cathode where they are reduced to hydrogen using the electrons provided by the external electrical supply. Hydrogen escapes through the diffusion layer.

In another aspect, the present invention concerns a photoelectrochemical cell, comprising a composite material according to the invention, preferably for water splitting. The photoelectrochemical cell advantageously comprises an electrically connected (photo)anode and/or (photo)cathode separated by an ionic conductive membrane and an ionic conductive electrolyte. In a preferred embodiment, the composite material of the invention is in contact with the (photo)cathode of the photoelectrochemical cell.

Any combination of the above described elements in all possible variations thereof is encompassed by the invention unless otherwise indicated herein or otherwise clearly contradicted by context. Thus, all features and embodiments described herein in particular as applicable, advantageous or preferred in the context of the invention are to be construed as being applicable in combination with one another, in preferred embodiments of the invention.

In addition to the above provisions, the invention also comprises other provisions, which will become clear from the description which follows, which refers to examples evaluating composite material (catalyst) according to the invention.

EXAMPLES

Preparation of Amorphous Molybdenum Sulfide (a-MoS$_x$) Via Chemical Oxidation of [MoS$_4$](NH$_4$)$_2$:

Sodium persulfate (4 mmol, 960 mg) was added to a deep-red solution of [MoS$_4$](NH$_4$)$_2$ (2 mmol, 520 mg) in water (100 mL) well degassed with Ar. The solution rapidly turned to a dark brown suspension which was continuously stirred under Ar for 2 hours. When the reaction was over, dark brown powder was collected by centrifugation, and thoroughly washed with water, ethanol, and diethyl ether. This product was dried under vacuum overnight and kept under an air atmosphere. The obtained sample was denoted as a-MoS$_x$.

Preparation of Amorphous Tungsten Sulfide (WS$_x$) and Amorphous Bi-Metal Sulfides (CoWS$_x$, FeMoS$_x$, CoMoS$_x$) Via Microwave Irradiation:

Appropriate amounts of metal salt (WCl$_6$: 1 mmol, 396 mg) and thiourea (1.5 mmol, 114.2 mg) precursors were mixed in ethylene glycol (10 mL). After stirring for 5 min, the solution was placed in a Discover SP microwave synthesizer (CEM Corporation) in a special 30 mL vial and the reaction was conducted under the following conditions: irradiation under 200 W to maintain the temperature at 255° C. leading to the pressure of 8 bar for 20 min. The resulting high-viscosity black precipitate was transferred into ethanol for centrifugation. Then, the precipitate was washed under centrifugation several times with ethanol and distilled water until the supernatant was clear. The final precipitate (ca. 150 mg) was vacuum-dried overnight and then collected for characterization. The obtained sample was denoted as a-WS$_x$.

Appropriate amounts of metal salts (WCl$_6$: 0.5 mmol, 198 mg and CoCl$_2$-6H$_2$O: 0.5 mmol, 119 mg) and thiourea (1.5 mmol, 114.2 mg) precursors were mixed in ethylene glycol (10 mL). After stirring for 5 min, the solution was placed in a Discover SP microwave synthesizer (CEM Corporation) in a special 30 mL vial and the reaction was conducted under the following conditions: irradiation varying from 0 to 300 W to maintain the temperature at 255° C. leading to the pressure of 8 bar for 20 min. The resulting high-viscosity black precipitate was transferred into ethanol for centrifugation. Then, the precipitate was washed under centrifugation several times with ethanol and distilled water until the supernatant was clear. The final precipitate (ca. 120 mg) was vacuum-dried overnight and then collected for characterization. The obtained sample was denoted as a-CoWS$_x$.

Appropriate amounts of metal salts (MoCl$_3$: 0.5 mmol, 101.1 mg and FeCl$_3$-6H$_2$O: 0.5 mmol, 135.2 mg) and thiourea (1.5 mmol, 114.2 mg) precursors were mixed in ethylene glycol (10 mL). After stirring for 5 min, the solution was placed in a Discover SP microwave synthesizer (CEM Corporation) in a special 30 mL vial and the reaction was conducted under the following conditions: irradiation varying from 0 to 300 W to maintain the temperature at 255° C. leading to the pressure of 8 bar for 20 min. The resulting high-viscosity black precipitate was transferred into ethanol for centrifugation. Then, the precipitate was washed under centrifugation several times with ethanol and distilled water until the supernatant was clear. The final precipitate (ca. 130 mg) was vacuum-dried overnight and then collected for characterization. The obtained sample was denoted as a-FeMoS$_x$.

Appropriate amounts of metal salts (MoCl$_3$: 0.5 mmol, 101.1 mg and CoCl$_2$·6H$_2$O: 0.5 mmol, 119 mg) and thiourea (1.5 mmol, 114.2 mg) precursors were mixed in ethylene glycol (10 mL). After stirring for 5 min, the solution was placed in a Discover SP microwave synthesizer (CEM Corporation) in a special 30 mL vial and the reaction was conducted under the following conditions: irradiation varying from 0 to 300 W to maintain the temperature at 255° C. leading to the pressure of 8 bar for 20 min. The resulting high-viscosity black precipitate was transferred into ethanol for centrifugation. Then, the precipitate was washed under centrifugation several times with ethanol and distilled water until the supernatant was clear. The final precipitate (ca. 130 mg) was vacuum-dried overnight and then collected for characterization. The obtained sample was denoted as a-CoMoS$_x$.

Preparation of a Composite Material a-MoS$_x$-P3HT According to the Invention:

A solution of poly(3-hexylthiophene-2,5-diyl) (P3HT, M102 95.7% RR from Ossila, Mw=65,200) in o-dichlorobenzene (o-DCB) was prepared at a concentration of 0.25 mg·mL$^{-1}$ The amorphous molybdenum sulfide (120 mg) was dispersed in 25 mL solution (0.25 mg·mL$^{-1}$) of P3HT in o-DCB and kept under stirring for 24 hours. The mass ratio between a-MoS$_x$ and P3HT is of 20:1. Then, the composite material obtained was collected by centrifugation, washed with ethanol and water. Finally, the composite material was dried under vacuum overnight and kept under an air atmosphere.

Preparation of Other Composite Materials According to the Invention:

A solution of poly(3-hexylthiophene-2,5-diyl) (P3HT, M102 95.7% RR from Ossila, Mw=65,200) in o-dichlorobenzene (o-DCB) was prepared at a concentration of 0.25 mg·mL$^{-1}$. The (bi)metal sulfides prepared above (a-WS$_x$, a-CoWS$_x$, a-FeMoS$_x$, a-CoMoS$_x$) (120 mg) were each dispersed in 25 mL solution (0.25 mg-mL$^1$) of P3HT in o-DCB and kept under stirring for 24 hours. The mass ratio between each (bi)metal sulfide and P3HT is of 20:1. Then, the composite materials obtained were collected by centrifugation, washed with ethanol and water. Finally, the composite materials were dried under vacuum overnight and kept under an air atmosphere. The samples were denoted as "composite material catalyst name-P3HT (20:1)" afterwards and in the Figures.

Electrodes Preparation:

Electrochemical activity of the catalysts towards the HER was determined using a gas diffusion electrode (GDE) as working electrode. For each composite material prepared above, a catalyst ink including 1 mg of composite material (catalyst), 0.2 mg of CNTs (NANOCYL® NC7000™ multiwall carbon nanotubes, Belgium), 160 µL of ethanol, 40 µL of water, and 10 µL of 5 wt % Nafion® perfluorinated resin solution, was prepared by sonication. Then, four aliquots of 10 µL of the catalyst ink were successively deposited on the microporous layer of a pristine 0.196 cm$^2$ gas diffusion layer (GDL with microporous layer, SIGRACET® 39-BC (SGL Carbon Gmbh, Germany)) to reach a catalyst loading of 0.97 mg·cm$^{-2}$ (corresponding to 40 µL of catalyst ink). The working GDE with the deposited catalyst layer was used in a three-electrode cell configuration.

Variation of the P3HT Concentration:

The composite materials of two synthesized catalysts, WS$_x$ and CoWS$_x$, were prepared according to the same protocol as described above but with a lower concentration of 0.125 mg·mL$^{-1}$ of P3HT in o-DCB. In this case, the mass ratio between the catalyst and P3HT is of 40:1. The samples were denoted as "composite material catalyst name-P3HT (40:1)" afterwards and in the Figures.

Electrochemical Measurements:

The electrochemical measurements were performed in a continuously degassed electrolyte by nitrogen bubbling, in a three-electrode cell configuration, and using a Bio-Logic SP300 potentiostat. The electrocatalytic activity towards the HER was evaluated in H$_2$SO$_4$ (0.5 M, pH 0.3) electrolyte using in a half-cell holder for GDE setup (Le Goff et al. Science 2009, 326, 1384-1387). The working electrode was a GDL substrate with the deposited catalyst layer fixed in the half-cell holder. A gas flow was going at the surface of the GDL to remove the produced H$_2$. The pipe used to evacuate the gas was also used as a contact with the modified GDL. The counter electrode consisted of a Ti wire and the reference electrode was a Ag/AgCl, KCl (3 M) (denoted below Ag/AgCl). Polarization curves were recorded using the linear sweep voltammetry (LSV) technique at a scan rate of 5 mV·s$^{-1}$ and 25° C. The stability tests were conducted by chronopotentiometry (CP) measurements under N$_2$-saturated or O$_2$-saturated electrolyte for 24 h. The constant applied current was related to the geometric area of the working electrode in order to attain a current density of −10 mA-cm$^{-2}$ (cathodic current). Data extracted from CP measurements were used to evaluate the evolution of the overpotential for a-MoS$_x$ and a-MoS$_x$-P3HT during 24 hours operation ($\Delta OP_{10}$ $_{mAcm-2}$/mV=OP$_{10}$ $_{mAcm-2}$ (t)/mV−OP$_{10}$ $_{mAcm-2}$(t$_0$)/mV), under N$_2$-saturated or O$_2$-saturated electrolyte.

All curves were IR-corrected by carrying out automatically ohmic drop compensation by the Bio-Logic EC-Lab® software. Current densities were normalized by rapport to the geometric area of the electrode (0.056 cm$^2$). All potentials were reported vs the Reversible Hydrogen Electrode (RHE) potential using the following equation: $E_{vs\ RHE} = E_{vs\ Ag/AgCl} - E_{Ag/AgCl\ vs\ NHE} + 0.059 \times pH$.

The electrochemically active surface area (ECSA) of the electrode was determined by through the electrochemical determination of the double layer capacitance ($C_{DL}$) of the electrode (Lukaszewski et al. Int. J. Electrochem. Sci., 11 (2016) 4442-4469). Cyclic voltammograms were measured at various scan rates (from 10 to 100 mV·s$^{-1}$, using Bio-Logic EC-Lab® software) in a potential range where no faradaic process was observed so as to measure the capacitive current originated from double-layer charging. The capacitive currents were plotted as a function of the CV scan rate. These data were fit to a line, the slope of which is equal to $C_{DL}$. From that value, ECSA was determined from the ratio between $C_{DL}$ and the specific capacitance $C_S$ of the electrode material (ECSA=$C_{DL}$/$C_S$). The $C_S$ value of 35 µF·cm$^{-2}$ was used in the example (McCrory et al. J. Am. Chem. Soc. 2015, 137, 4347-4357).

The roughness factor (RF) is the ratio between the electrochemically active surface area (ECSA) and the geometric area (RF=ECSA/$S_{geom}$).

Figure 2:
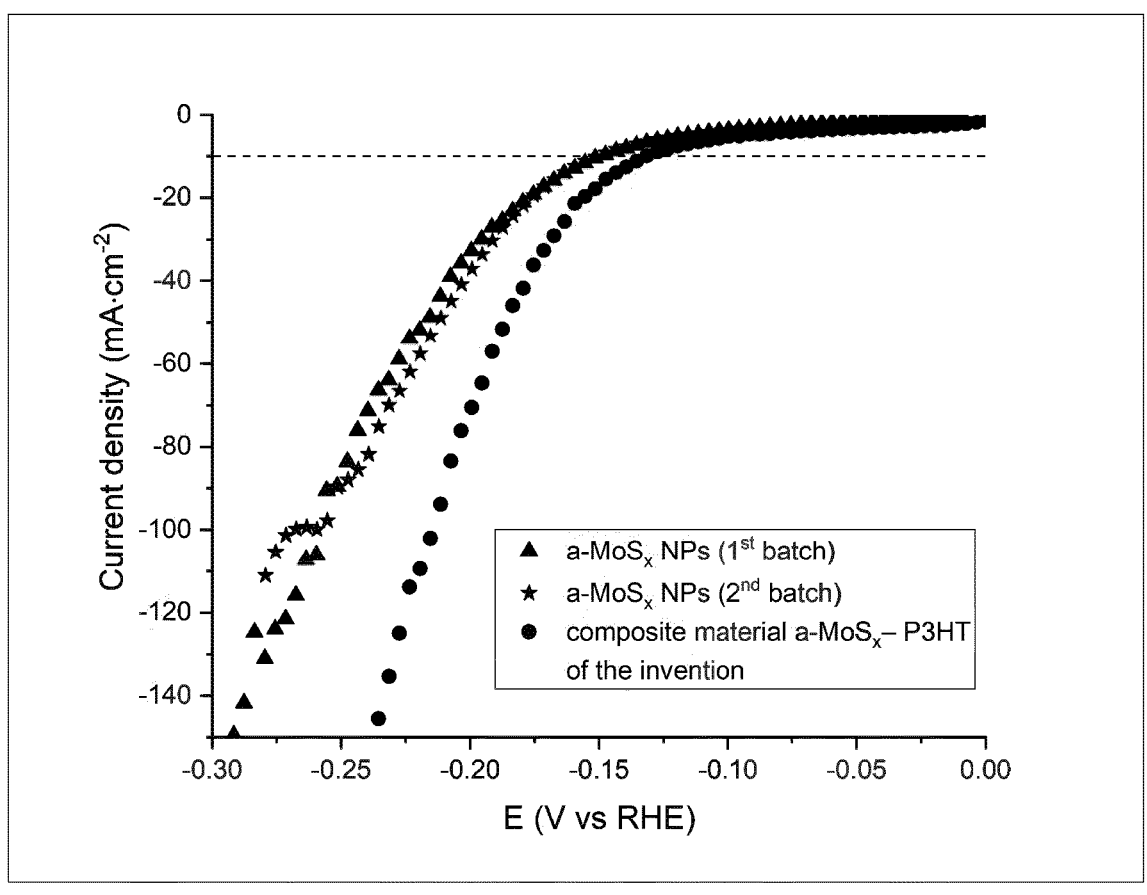
FIG. 2 shows the polarization curves for HER obtained with amorphous $a-MoS_x$ catalyst (two different batches) (representative of the prior art) and with the composite $a-MoS_x$-P3HT material (catalyst of the invention), wherein the surface used is the geometric surface of the electrode.

FIG. 2 shows the polarization curves for HER on amorphous molybdenum sulfide catalyst (two different batches) (representative of the prior art) and the composite material a-MoS$_x$-P3HT previously prepared (catalyst of the invention). The required overpotential ($\eta_{10}^{HER}$) to reach a current density per geometric area of 10 mA·cm$^{-2}$ is of 130 mV for the a-MoS$_x$-P3HT catalyst, compared to 155 mV for a-MoS$_x$ catalyst representative of the prior art. The polarization curves of FIG. 2 demonstrate that the composite material of the invention has a significantly smaller increase in potential, and therefore an enhanced stability, than the a-MoS$_x$ catalyst of the prior art.

Figure 3:
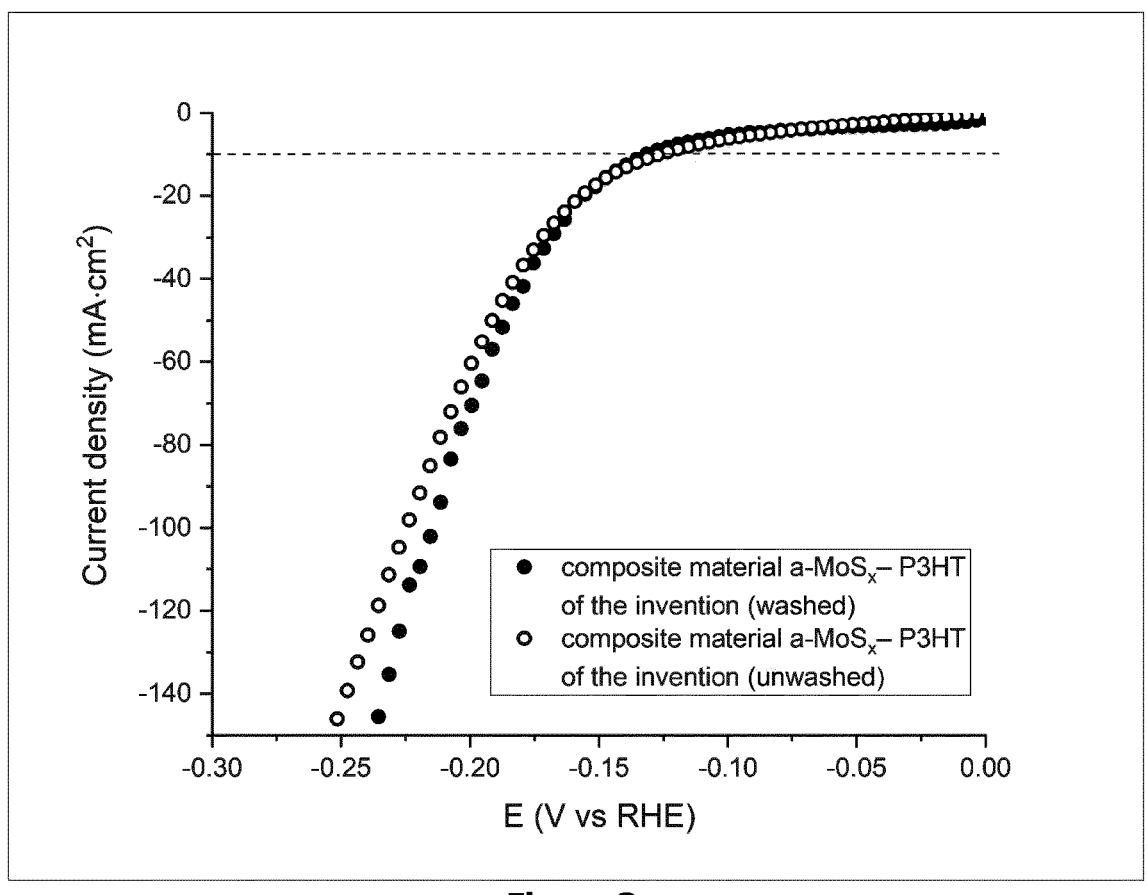
FIG. 3 shows the polarization curves for HER obtained with the composite $a-MoS_x$-P3HT material (catalyst of the invention) (washed and unwashed), wherein the surface used is the geometric surface of the electrode.

FIG. 3 shows the polarization curves for HER on the composite material a-MoS$_x$-P3HT (catalyst of the invention) (unwashed and washed with ethanol and water as described above). No significant difference for the overpotential $\eta_{10}^{HER}$ was observed between the washed and unwashed forms of the a-MoS$_x$-P3HT catalyst.

Figure 5:
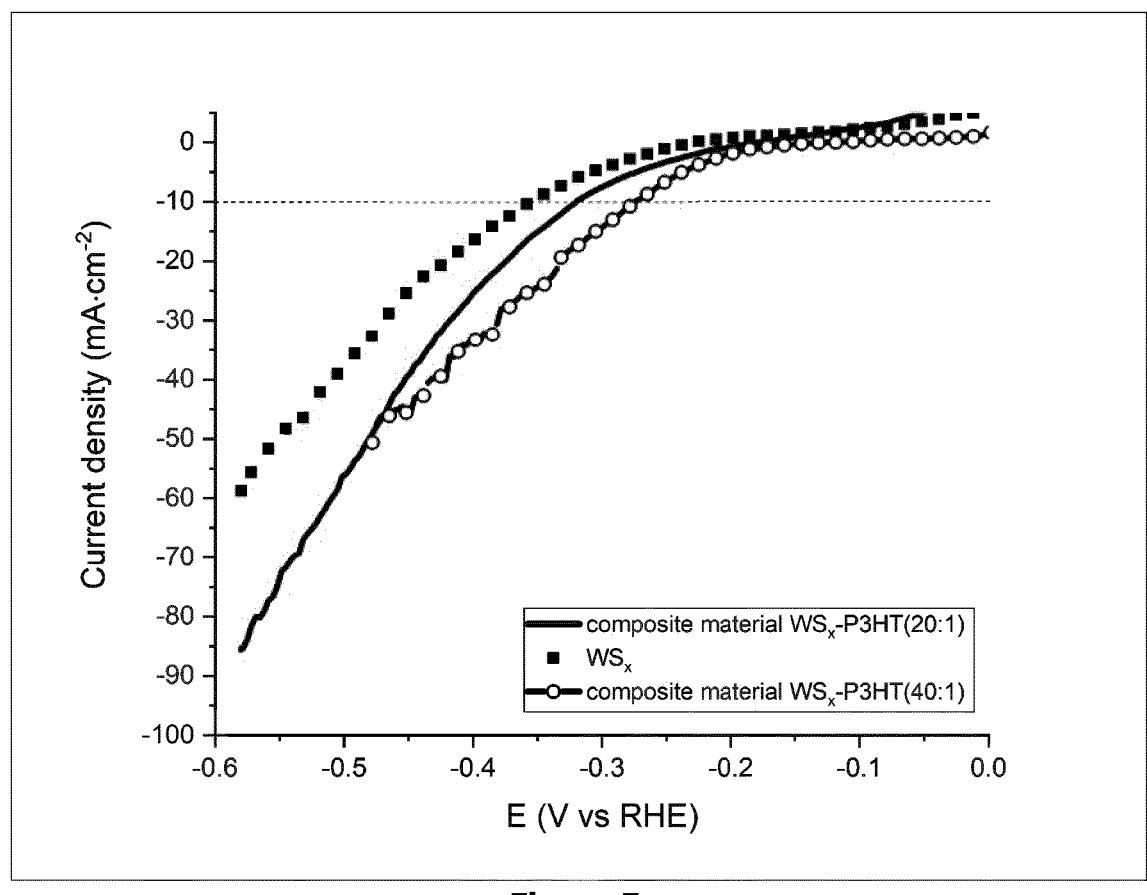
FIG. 5 shows the polarization curves for HER obtained with the composite $WS_x$-P3HT (20:1) and $WS_x$-P3HT (40:1) materials (catalysts of the invention) and with $WS_x$ catalyst, wherein the surface used is the geometric surface of the electrode.

FIG. 5 shows the polarization curves for HER on tungsten sulfide catalyst and the composite materials WS$_x$-P3HT (20:1) and WS$_x$-P3HT (40:1). The required overpotential ($\eta_{10}^{HER}$) to reach a current density per geometric area of 10 mA·cm$^{-2}$ is of 320 mV for the WS$_x$-P3HT (20:1) catalyst and 275 mV for the WS$_x$-P3HT (40:1) catalyst, compared to 358 mV for WS$_x$ catalyst.

Figure 6:
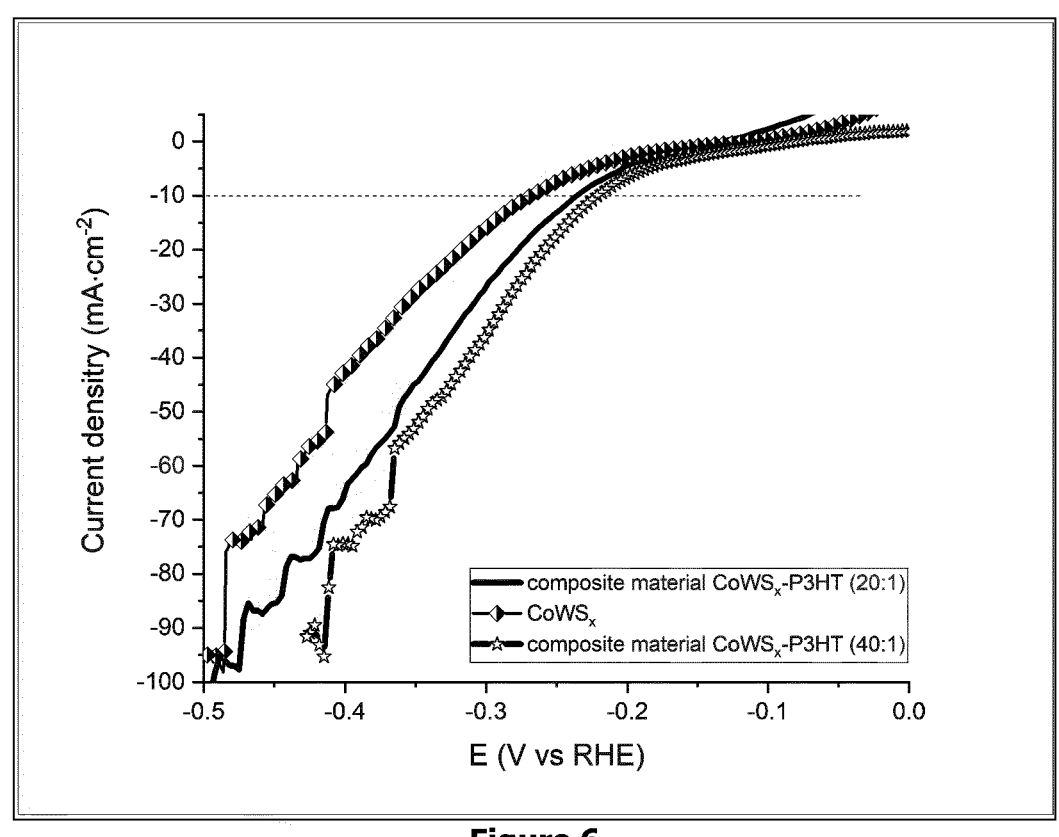
FIG. 6 shows the polarization curves for HER obtained with the composite $CoWS_x$-P3HT (20:1) and $CoWS_x$-P3HT (40:1) materials (catalysts of the invention) and with $CoWS_x$ catalyst, wherein the surface used is the geometric surface of the electrode.

FIG. 6 shows the polarization curves for HER on cobalt-tungsten sulfide catalyst and the composite materials CoWS$_x$-P3HT (20:1) and CoWS$_x$-P3HT (40:1). The required overpotential ($\eta_{10}^{HER}$) to reach a current density per geometric area of 10 mA·cm$^{-2}$ is of 236 mV for the CoS$_x$-P3HT (20:1) catalyst and 223 mV for the CoWS$_x$-P3HT (40:1) catalyst, compared to 273 mV for CoWS$_x$ catalyst.

Figure 7:
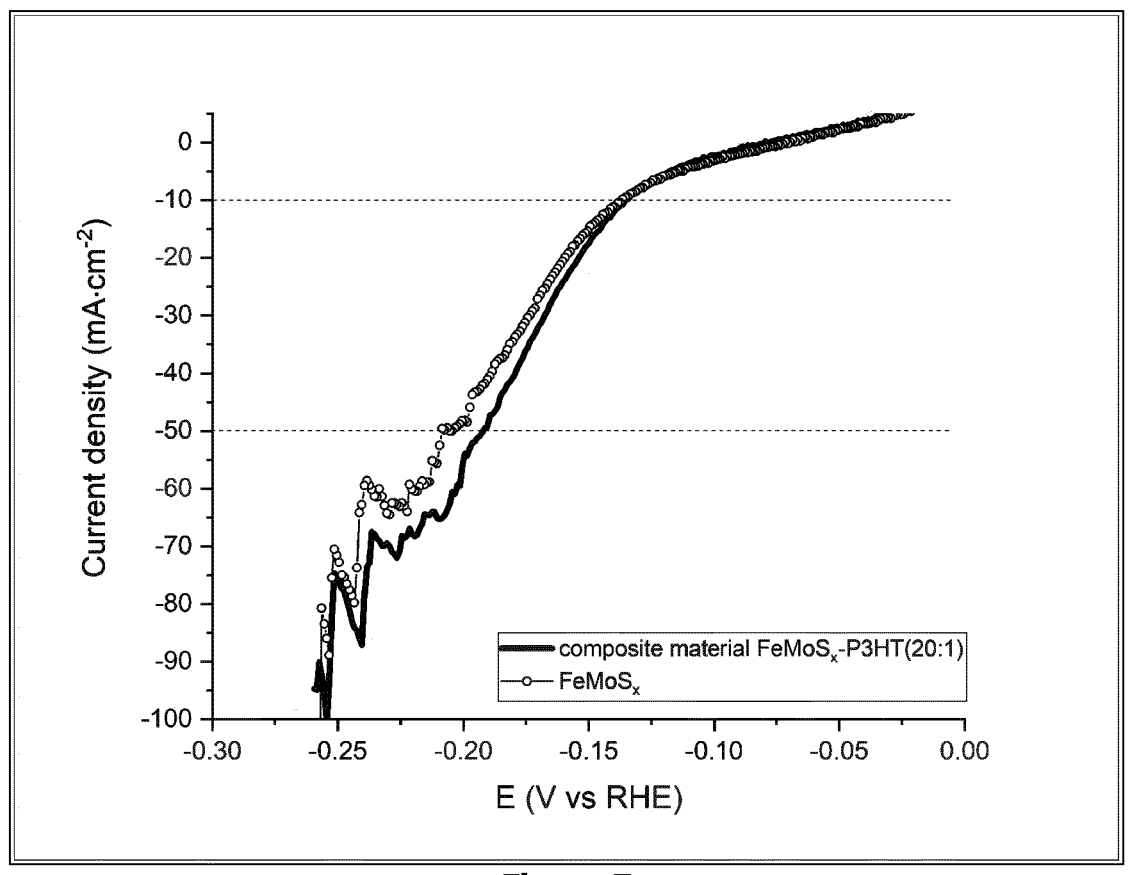
FIG. 7 shows the polarization curves for HER obtained with the composite $FeMoS_x$-P3HT (20:1) material (catalyst of the invention) and with $FeMoS_x$ catalyst, wherein the surface used is the geometric surface of the electrode.

FIG. 7 shows the polarization curves for HER on iron-molybdenum sulfide catalyst and the composite material FeMoS$_x$-P3HT (20:1). The required overpotential ($\eta_{10}^{HER}$) to reach a current density per geometric area of 10 mA·cm$^{-2}$ is of 136 mV in both cases. Although the improvement in HER activity (corresponding to lower $\eta_{10}^{HER}$ overpotential) could not be seen at ~10 mA·cm$^{-2}$, it could be observed for the composite material FeMoS$_x$-P3HT (20:1) at current densities. An improvement in the HER activity was observed for the composite material FeMoS$_x$-P3HT (20:1) at higher current densities. For example, the required overpotential ($\eta_{50}^{HER}$) to reach a current density per geometric area of 50 mA·cm$^{-2}$ is of 192 mV for the FeMoS$_x$-P3HT (20:1) compared to 206 mV for FeMoS$_x$ catalyst.

Figure 8:
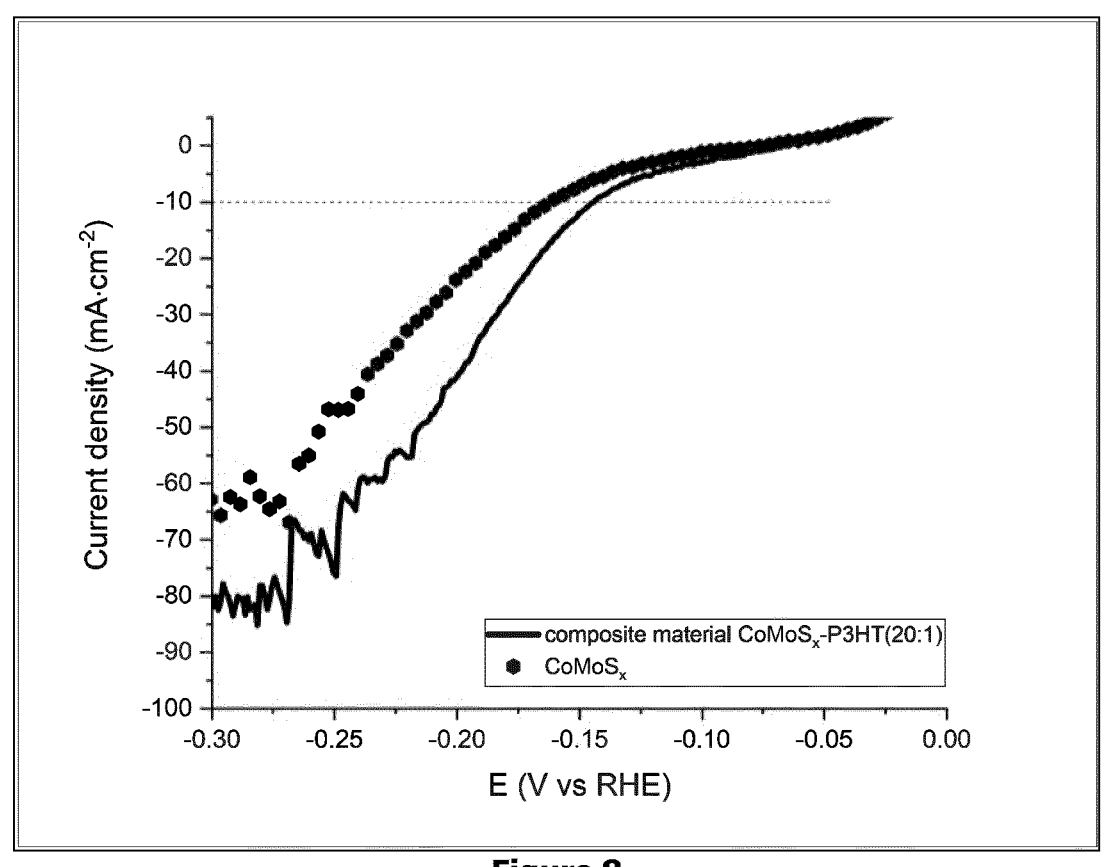
FIG. 8 shows the polarization curves for HER obtained with the composite $CoMoS_x$-P3HT (20:1) material (catalyst of the invention) and with $CoMoS_x$ catalyst, wherein the surface used is the geometric surface of the electrode.

FIG. 8 shows the polarization curves for HER on cobalt-molybdenum sulfide catalyst and the composite material CoMoS$_x$-P3HT (20:1). The required overpotential ($\eta_{10}^{HER}$) to reach a current density per geometric area of 10 mA·cm$^{-2}$ is of 145 mV for the CoMoS$_x$-P3HT (20:1) catalyst, compared to 162 mV for CoWS$_x$ catalyst.

Additional Performances:

| | Amorphous a-MoS$_x$ catalyst of the prior art | Composite material a-MoS$_x$-P3HT of the invention |
| --- | --- | --- |
| Average C$_{DL}$ (µF) | 6.43 ± 0.2 | 17.35 ± 0.6 |
| ECSA (cm$^2$) | 0.184 | 0.496 |
| RF | 3.28 | 8.86 |

ECSA represents the surface area of the electrode material that is accessible to the electrolyte and that is available for faradic charge transfer. Dividing ECSA by the geometric surface of the electrode yields the roughness factor, which is an intrinsic parameter of the electrode material.

The three times increase at the same loading in roughness factor for the composite material a-MoS$_x$-P3HT of the invention compared to amorphous a-MoS$_x$ catalyst of the prior art highlights a higher structuration with access of more catalytic sites to the electrolyte to achieve catalysis for the composite material of the invention, in line with the improved HER activity for the composite material of the invention.

FIG. 9 shows the chronopotentiometric (CP) curves (stability test) of a-MoS$_x$ and a-MoS$_x$-P3HT under N$_2$-saturated electrolyte (a, b) or O$_2$-saturated electrolyte (c, d). Data extracted from CP curves are presented as columns graphs in FIG. 10 and FIG. 11 in order to evaluate the evolution of OP$_{10mA·cm-2}$ during 24 hours operation.

Figure 9A:
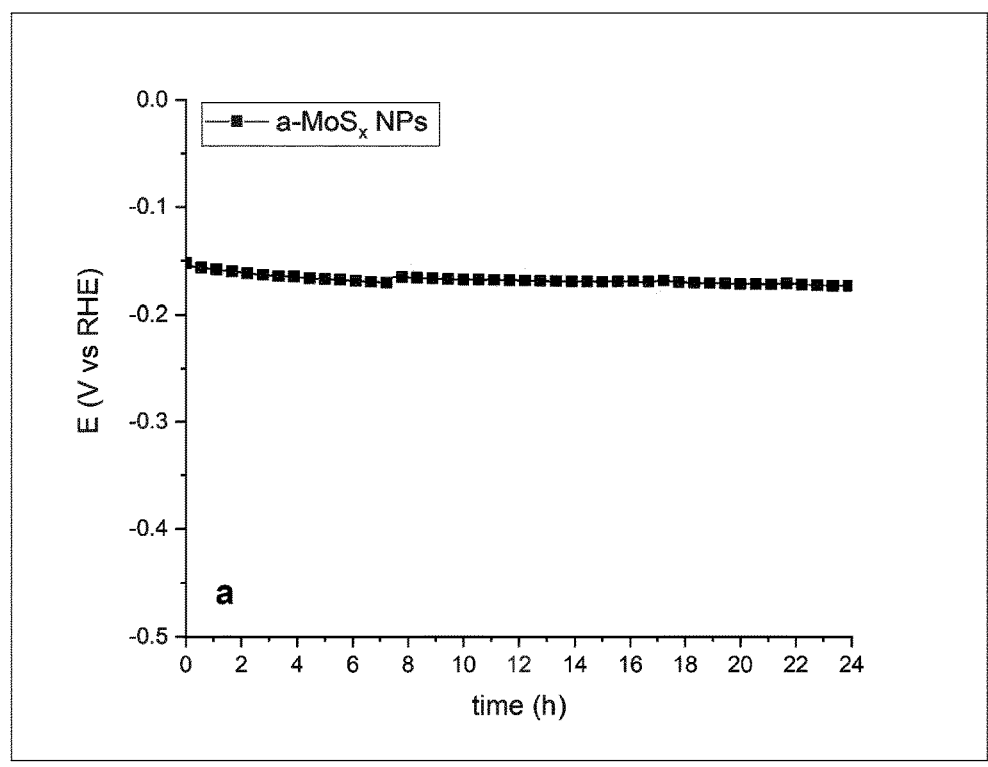
FIG. 9 shows the chronopotentiometric curves (stability test) of $a-MoS_x$ and $a-MoS_x$-P3HT under $N_2$-saturated electrolyte (a, b) or $O_2$-saturated electrolyte (c, d).
Figure 9B:
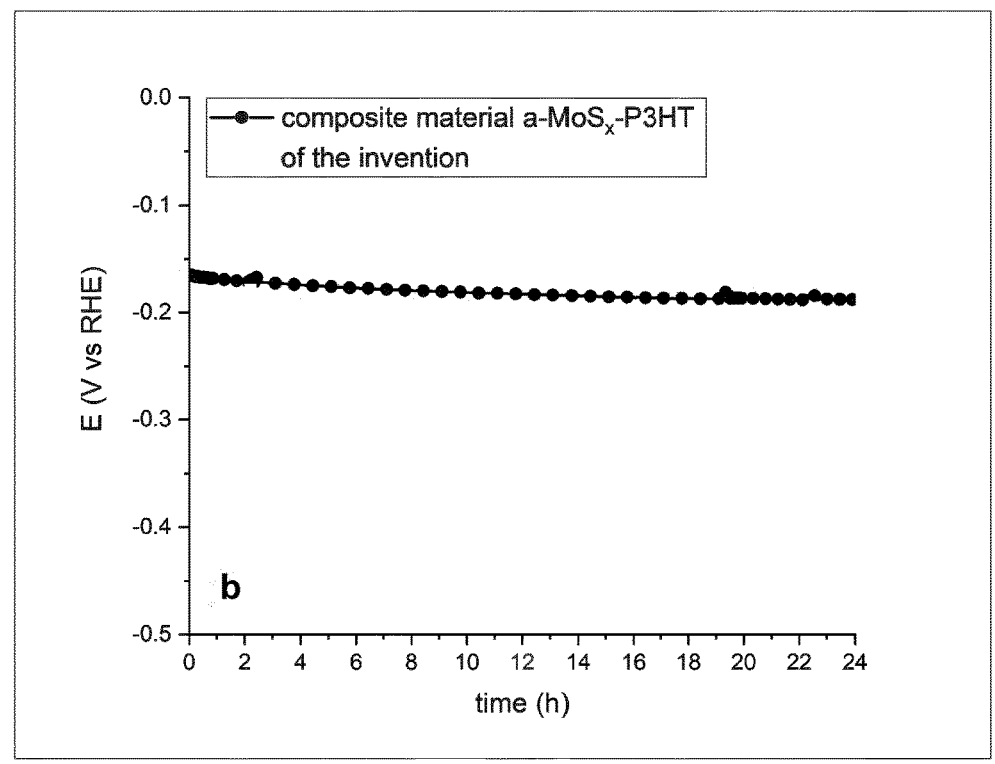
Figure 9C:
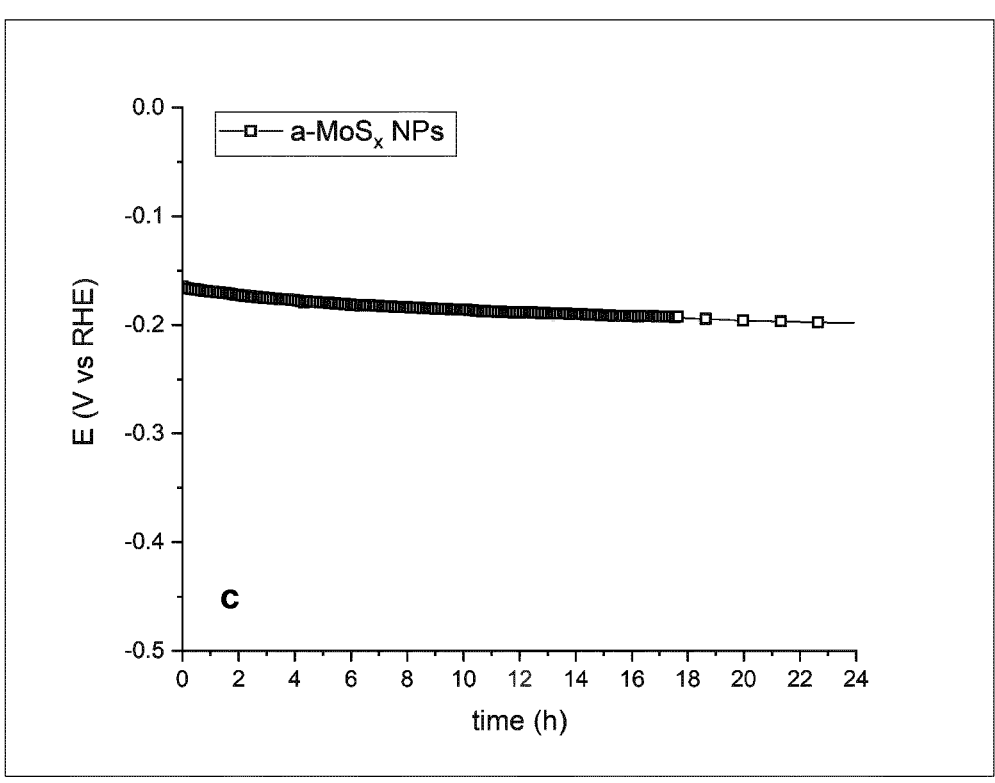
Figure 9D:
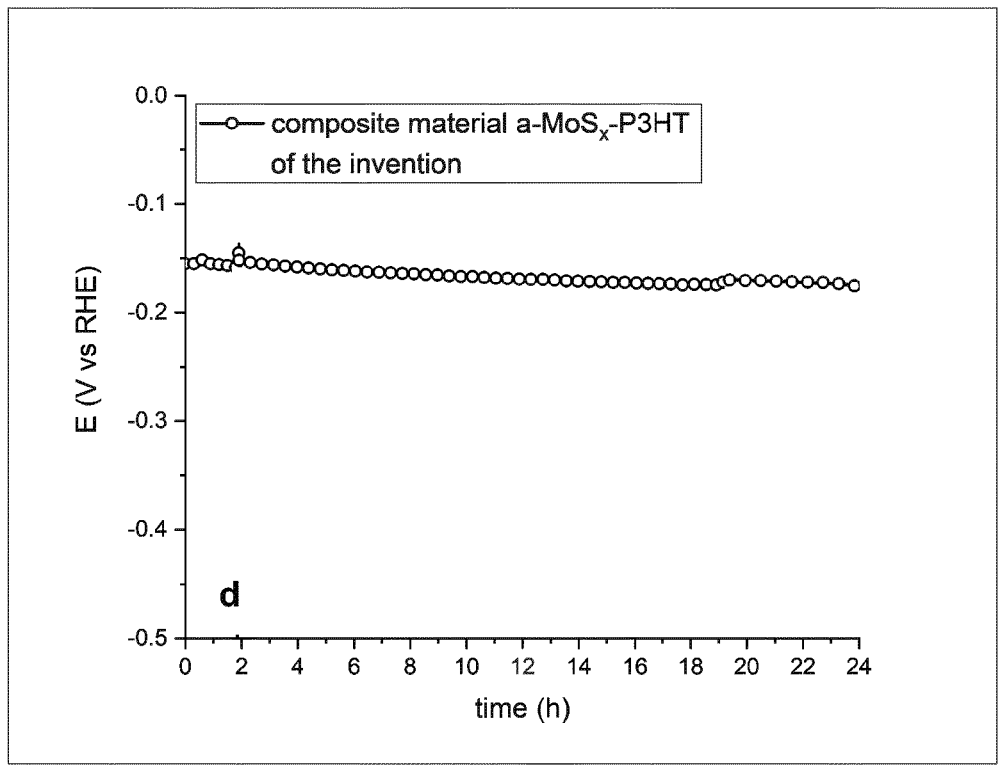
Figure 10:
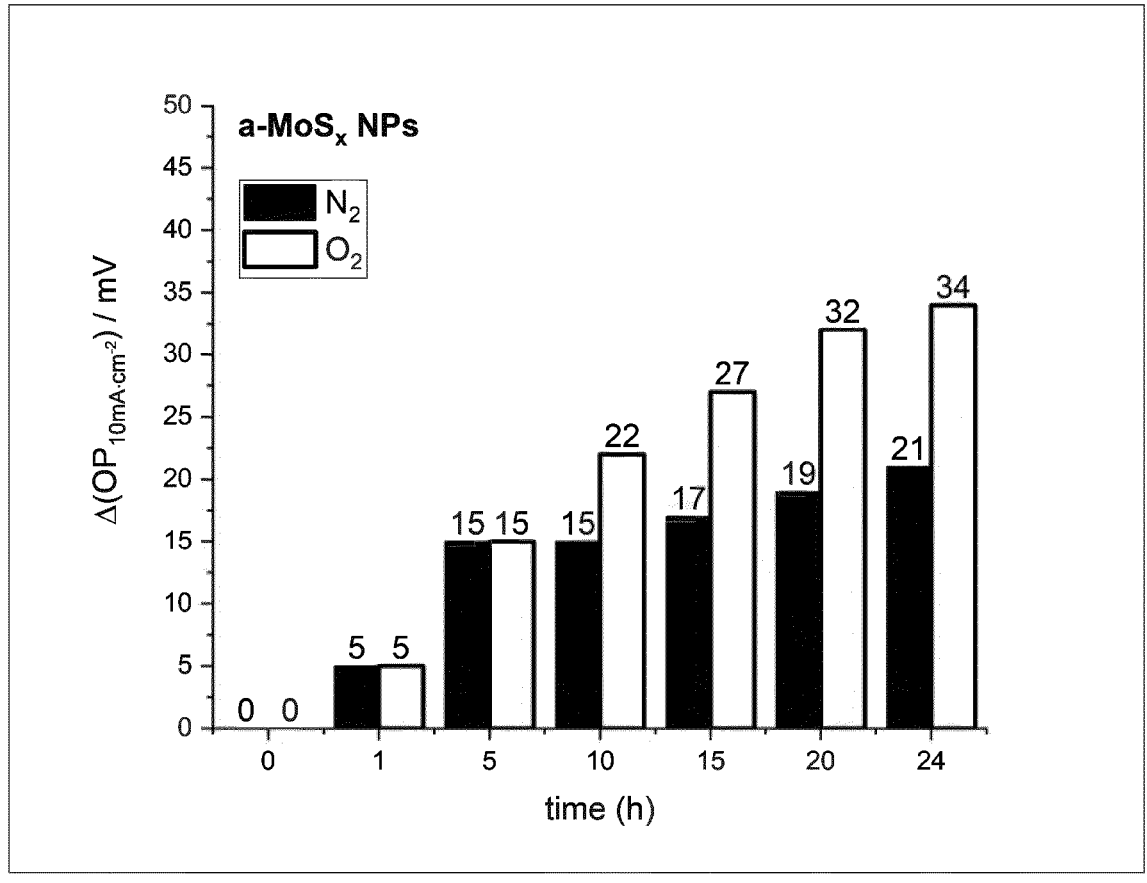
FIG. 10 shows the overpotential evolution (stability test) for $a-MoS_x$ during 24 hours operation ($\Delta OP_{10\ mAcm-2}$/mV=$OP_{10\ mAcm-2}$ (t)/mV–$OP_{10\ mAcm-2}$ ($t_0$)/mV) (data extracted from FIG. 9 (a, c))
Figure 11:
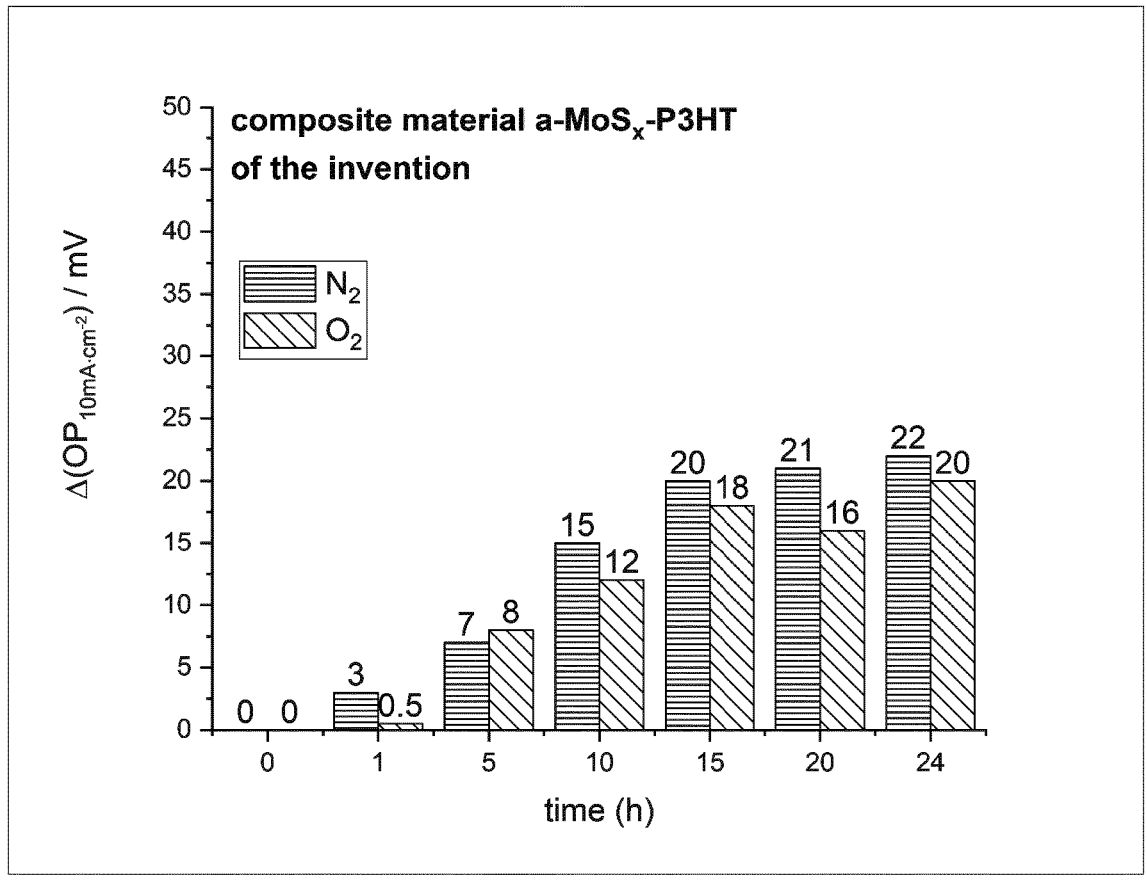
FIG. 11 shows the overpotential evolution (stability test) for $a-MoS_x$-P3HT during 24 hours operation ($\Delta OP_{10\ mAcm-2}^{HER}$/mV= $OP_{10\ mAcm-2}$ (t)/mV–$OP_{10\ mAcm-2}\eta$ ($t_0$)/mV) (data extracted from FIG. 9 (b, d)).
Figure 12A:
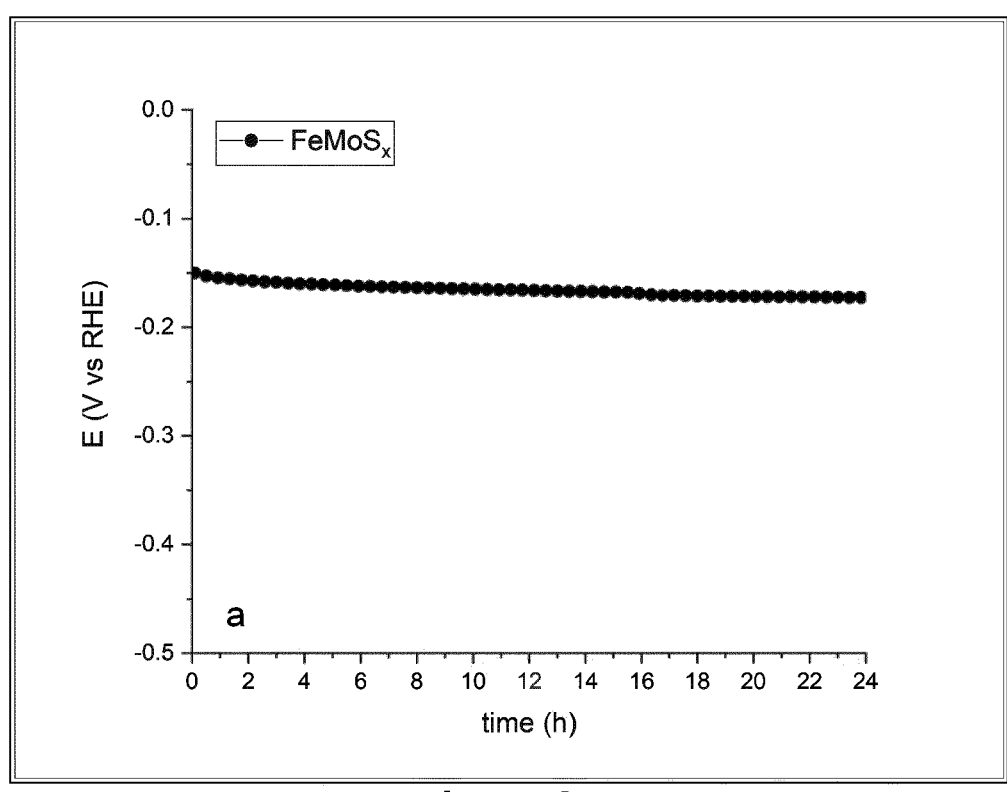
FIG. 12 shows the chronopotentiometric curves (stability test) of $FeMoS_x$ and $FeMoS_x$-P3HT (20:1) under $N_2$-saturated electrolyte (a, b) or $O_2$-saturated electrolyte (c, d).
Figure 12B:
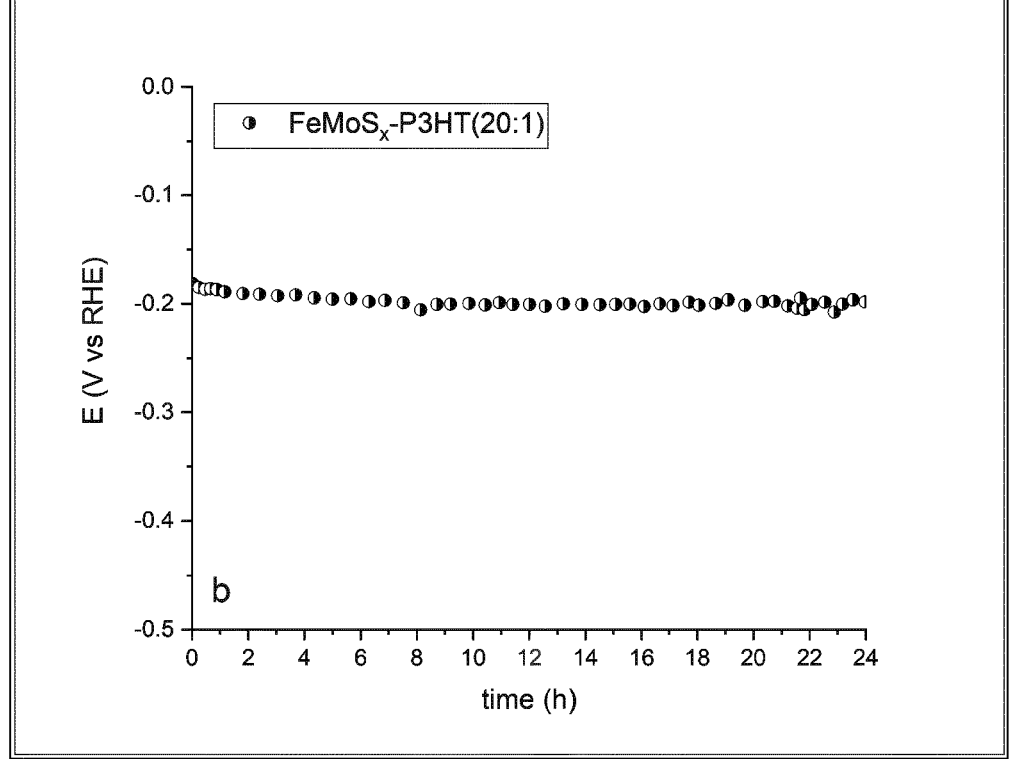
Figure 12C:
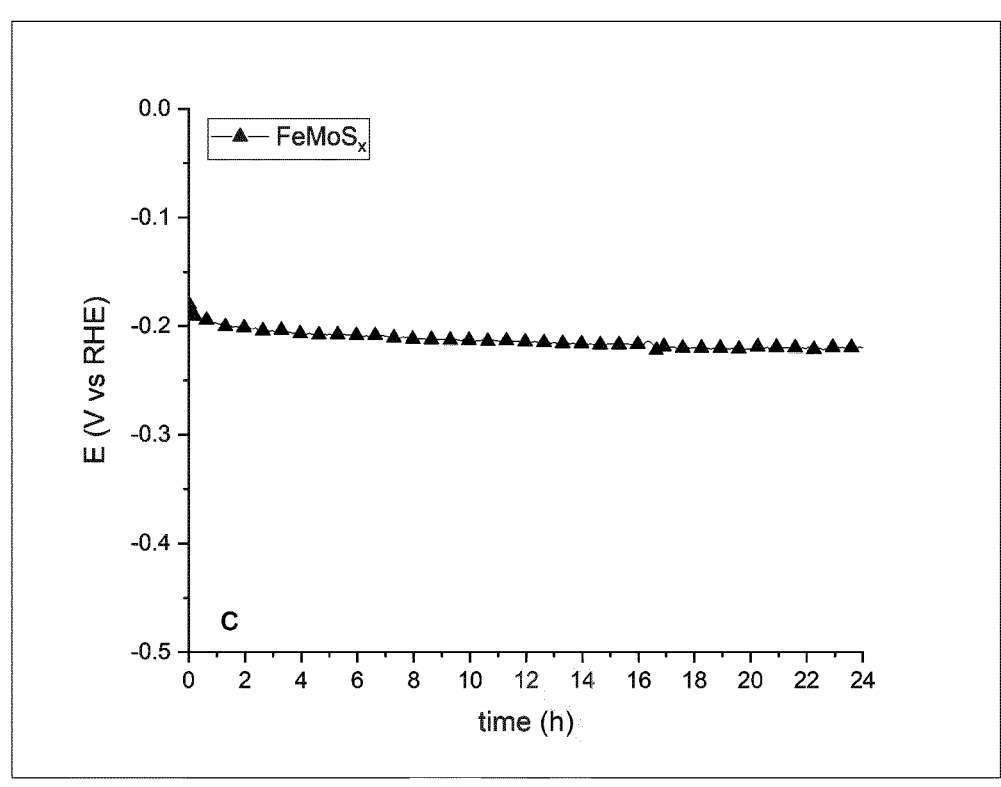
Figure 12D:
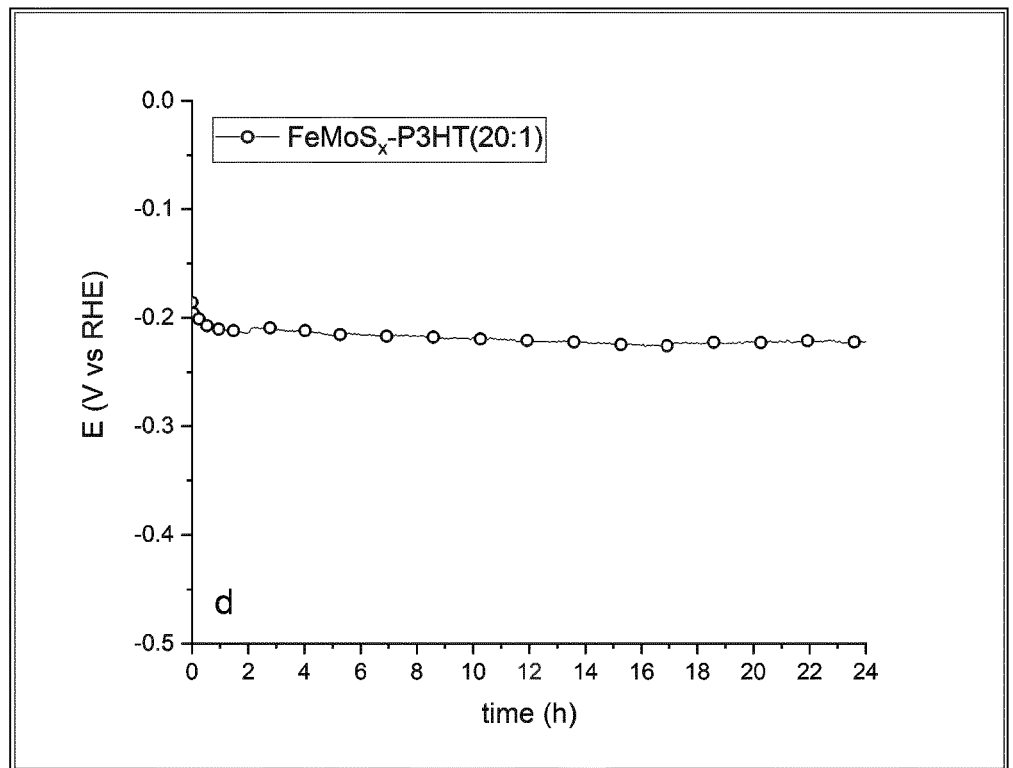

FIG. 9a shows the performance of the a-MoS$_x$ catalyst measured during 24 hours of continuous electrochemical H$_2$ evolution (potentiometric operation at 10 mA·cm$^{-2}$). The potential E (V vs RHE) required to reach 10 mA·cm$^{-2}$ (OP$_{10mA·cm-2}$ taken as arbitrary unit to record performance as it would correspond to a 10% solar to hydrogen efficiency of a photoelectrochemical cell) is increased by ~20 mV after 24 hours of electrolysis under relevant conditions. This increase in potential was also observed and found higher (~35 mV after 24 hours) when O$_2$ is added to the electrolyte FIG. 9c, modelling in an accelerated testing manner O$_2$ crossover through the membrane of an operating electrolyser as well as air entry when the electrolyser is off. Overpotential vs time (stability test) for a-MoS$_x$ during 24 hours operation ($\Delta OP_{10\ mAcm-2}$/mV=OP$_{10\ mAcm-2}$ (t)/mV−OP$_{10\ mAcm-2}$(t$_0$)/mV) (data extracted from FIG. 9 (a, c)) is shown in FIG. 10. FIGS. 9b and 9d show the same measurements for the material of the invention. FIG. 11 shows the overpotential vs time (stability test) for a-MoS$_x$-P3HT during 24 hours operation ($\Delta OP_{10\ mAcm-2}$/mV=OP$_{10\ mAcm-2}$ (t)/mV−OP$_{10\ mAcm-2}$(t$_0$)/mV) (data extracted from FIG. 9 (b, d)). a-MoS$_x$ and a-MoS$_x$-P3HT present almost similar stability under N$_2$-saturated electrolyte. a-MoS$_x$-P3HT presents an improved stability in the presence of O$_2$. The increase in potential in the presence of O$_2$ is significantly decreased (~20 mV) in the materials of the invention compared to ~35 mV for a-MoS$_x$, showing therefore enhanced stability for the composite material of the invention.

Similar stability tests were carried out for catalysts FeMoS$_x$, WS$_x$ and CoMoS$_x$, and for their corresponding composite materials FeMoS$_x$-P3HT (20:1), WS$_x$-P3HT (20:1) and CoMoS$_x$-P3HT (20:1).

Figure 13:
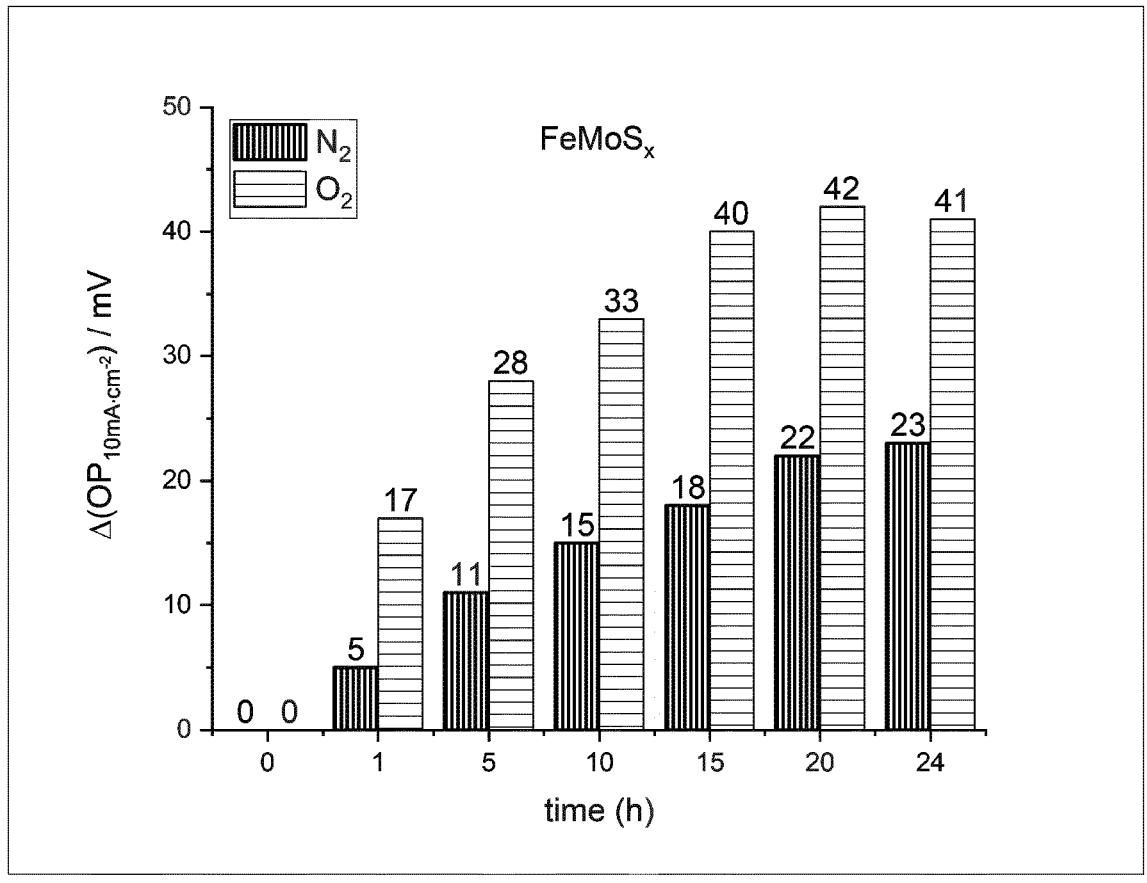
FIG. 13 shows the overpotential evolution (stability test) for $FeMoS_x$ during 24 hours operation ($\Delta OP_{10\ mAcm-2}$/mV=$OP_{10\ mAcm-2}$ (t)/mV–$OP_{10mAcm-2}$($t_0$)/mV) (data extracted from FIG. 12 (a, c))
Figure 14:
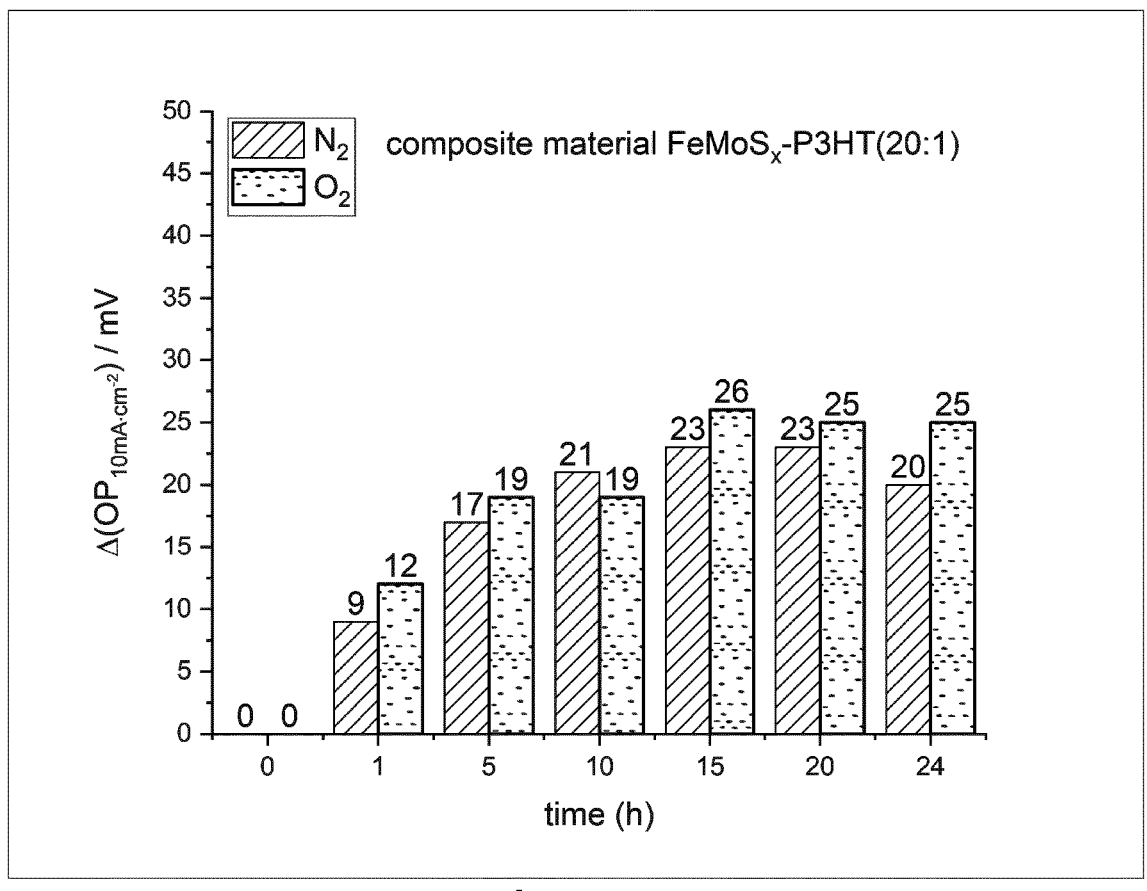
FIG. 14 shows the overpotential evolution (stability test) for $FeMoS_x$-P3HT (20:1) during 24 hours operation ($\Delta OP_{10\ mAcm-2}$/mV=$OP_{10\ mAcm-2}$ (t)/mV–$OP_{10\ mAcm-2}$ ($t_0$)/mV) (data extracted from FIG. 12 (b, d)).
Figure 15A:
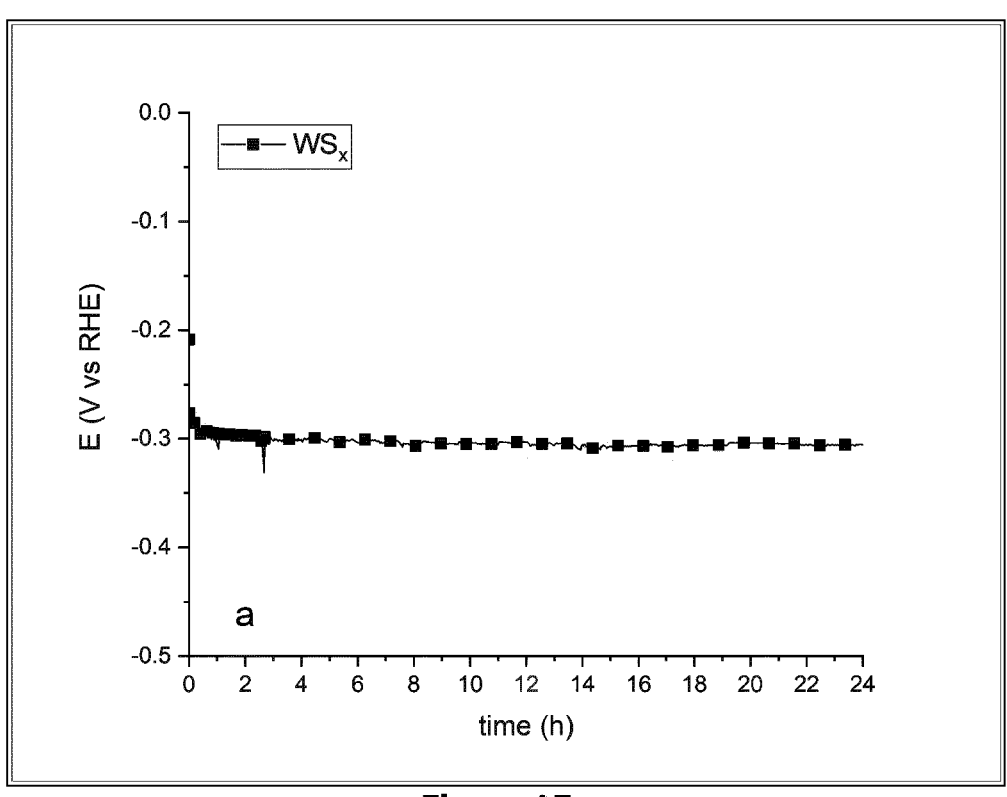
FIG. 15 shows the chronopotentiometric curves (stability test) of $WS_x$ and $WS_x$-P3HT (20:1) under $N_2$-saturated electrolyte (a, b) or $O_2$-saturated electrolyte (c, d).
Figure 15B:
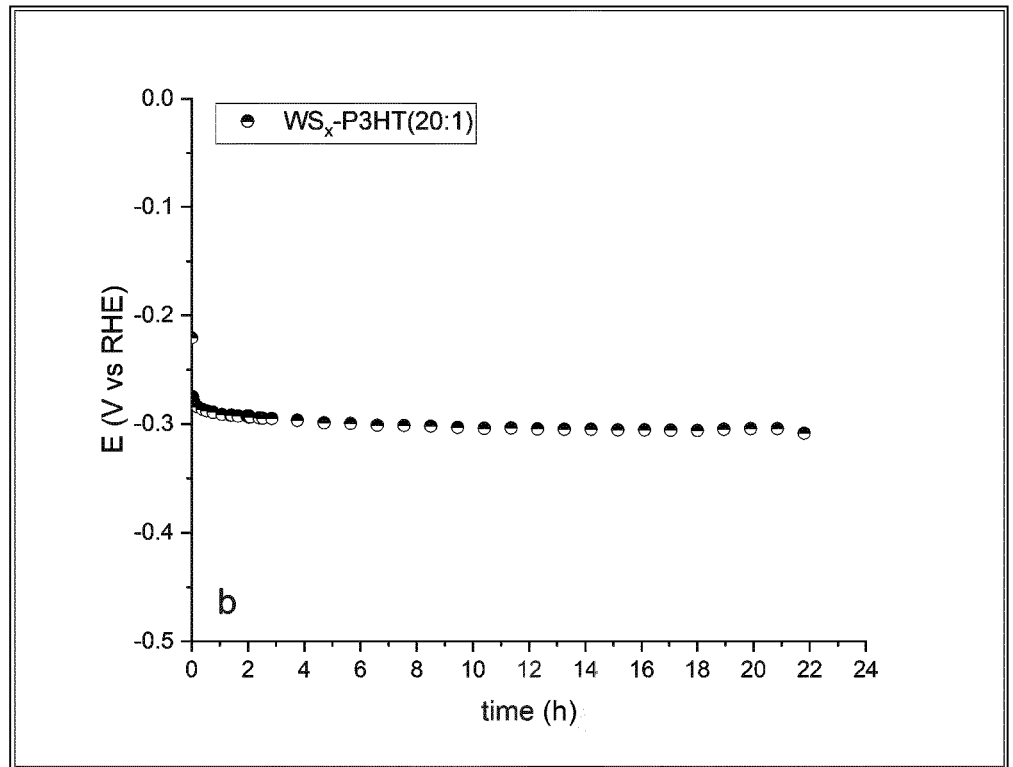
Figure 15C:
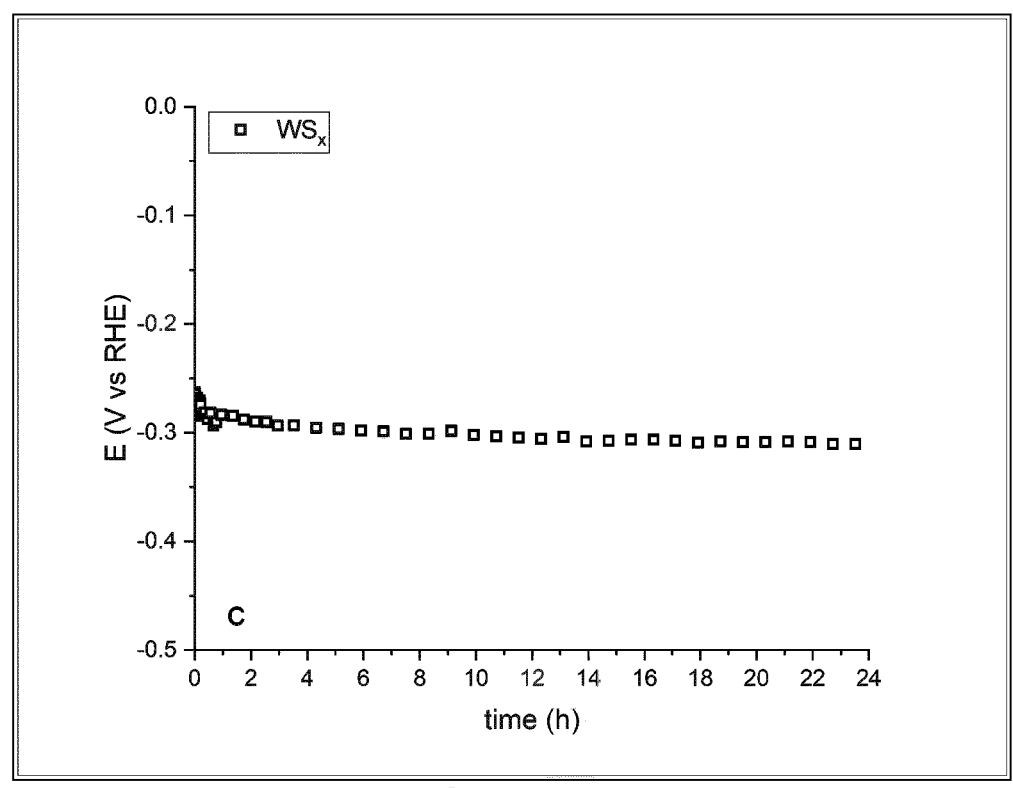
Figure 15D:
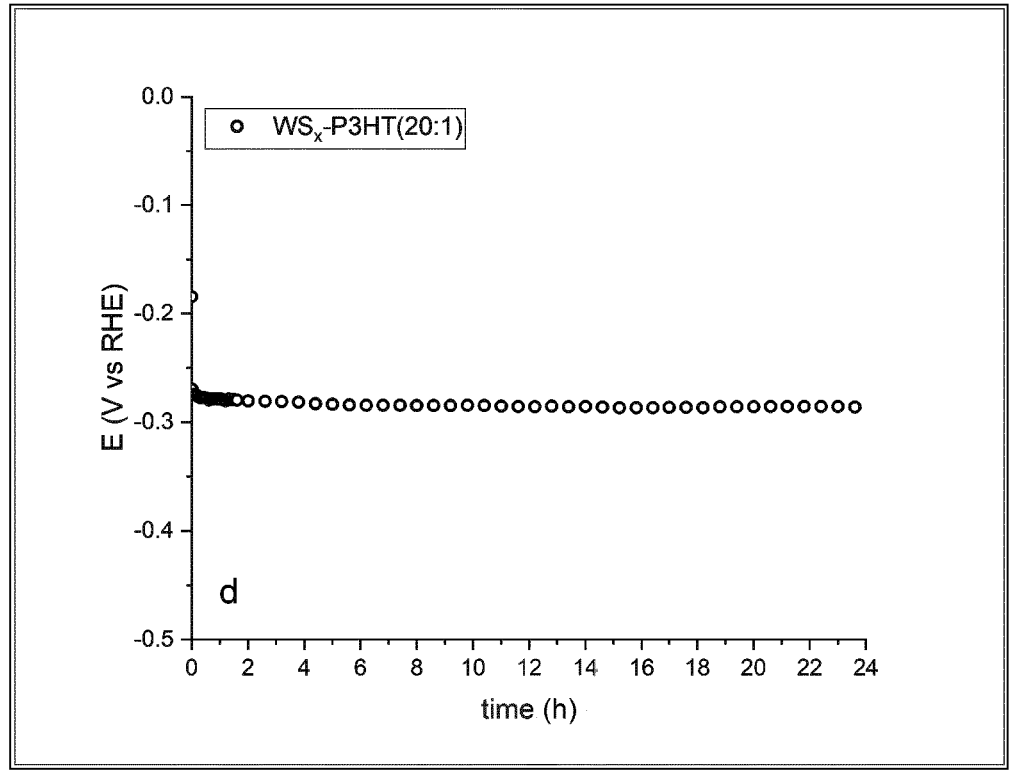

FIG. 12 shows the chronopotentiometric (CP) curves (stability test) of FeMoS$_x$ and FeMoS$_x$-P3HT (20:1) under N$_2$-saturated electrolyte (a, b) or O$_2$-saturated electrolyte (c, d). Data extracted from CP curves are presented as columns graphs in FIG. 13 and FIG. 14 in order to evaluate the evolution of OP$_{10\ mA \cdot cm-2}$ during 24 hours operation. The potential E (V vs RHE) required to reach 10 mA-cm$^{-2}$ is increased by ~23 mV for FeMoS$_x$ and FeMoS$_x$-P3HT (20:1) after 24 hours of electrolysis under N$_2$-saturated electrolyte. The potential E (V vs RHE) required to reach 10 mA·cm$^{-2}$ is increased by ~40 mV for FeMoS$_x$ and only by ~25 mV FeMoS$_x$-P3HT (20:1) after 24 hours of electrolysis under O$_2$-saturated electrolyte. An increased stability is therefore observed for FeMoS-P3HT (20:1) under oxygen atmosphere. Overpotential vs time (stability test) for FeMoS$_x$ during 24 hours operation ($\Delta$OP$_{10\ mAcm-2}$/mV=OP$_{10\ mAcm-2}$ (t)/mV−OP$_{10\ mAcm-2}$(t$_0$)/mV) (data extracted from FIG. 12 (a, c)) is shown in FIG. 13 Overpotential vs time (stability test) for FeMoS$_x$-P3HT during 24 hours operation ($\Delta$OP$_{10\ mAcm-2}$/mV=OP$_{10\ mAcm-2}$ (t)/mV−OP$_{10\ mAcm-2}$(t$_0$)/mV) (data extracted from FIG. 12 (b, d)) is shown in FIG. 14.

Figure 16:
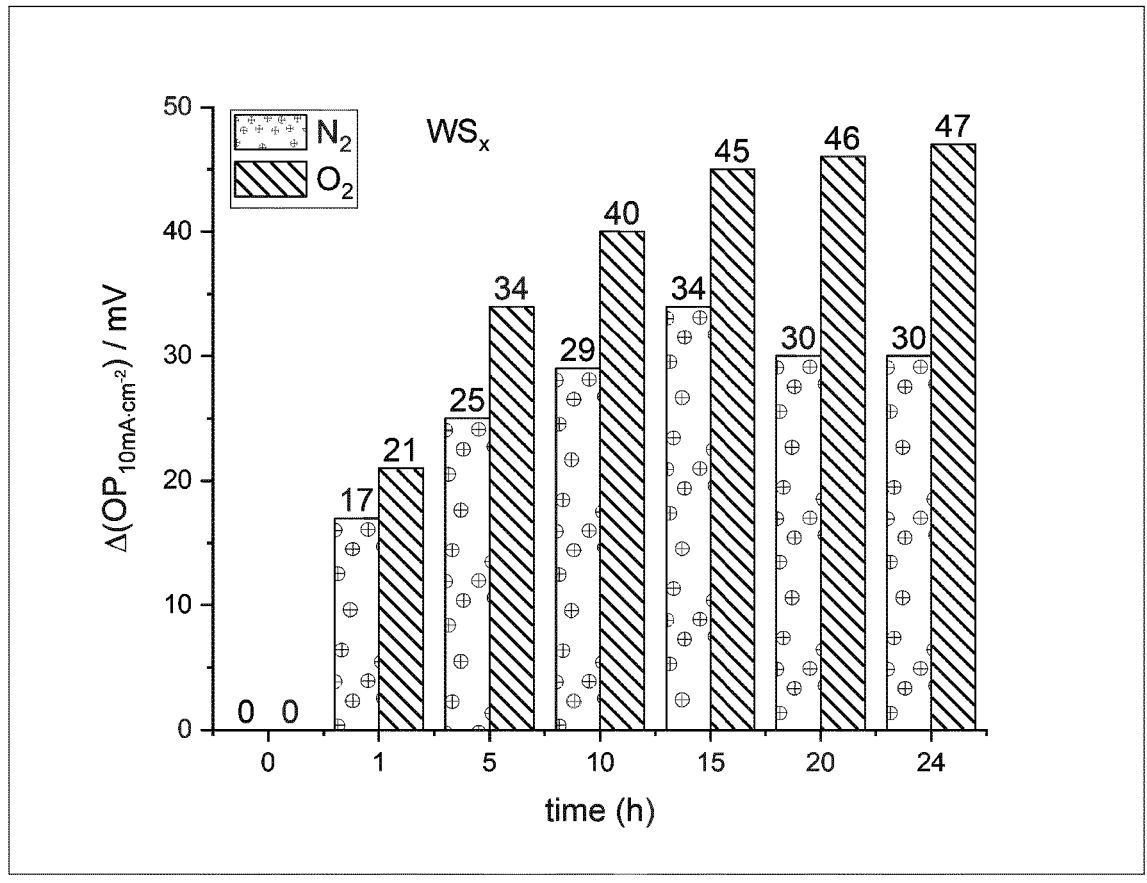
FIG. 16 shows the overpotential evolution (stability test) for $WS_x$ during 24 hours operation ($\Delta OP_{10\ mAcm-2}$/ $mV=OP_{10\ mAcm-2}$ (t)/mV$-OP_{10\ mAcm-2}(t_0)$/mV) (data extracted from FIG. 15 (a, c))
Figure 17:
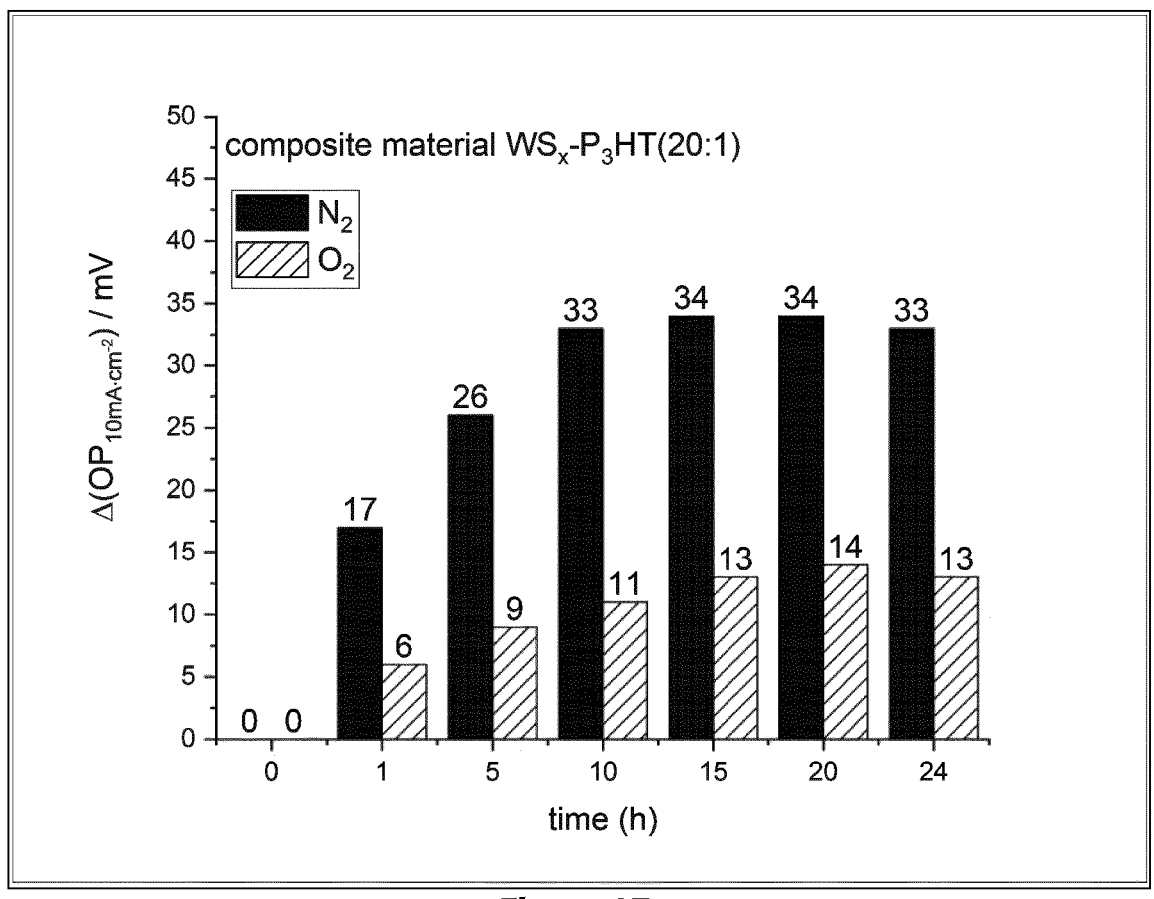
FIG. 17 shows the overpotential evolution (stability test) for $WS_x$-P3HT (20:1) during 24 hours operation ($\Delta OP_{10\ mAcm-2}$/mV$=OP_{10\ mAcm-2}$ (t)/mV$-OP_{10\ mAcm-2}(t_0)$/mV) (data extracted from FIG. 15 (b, d)).
Figure 18A:
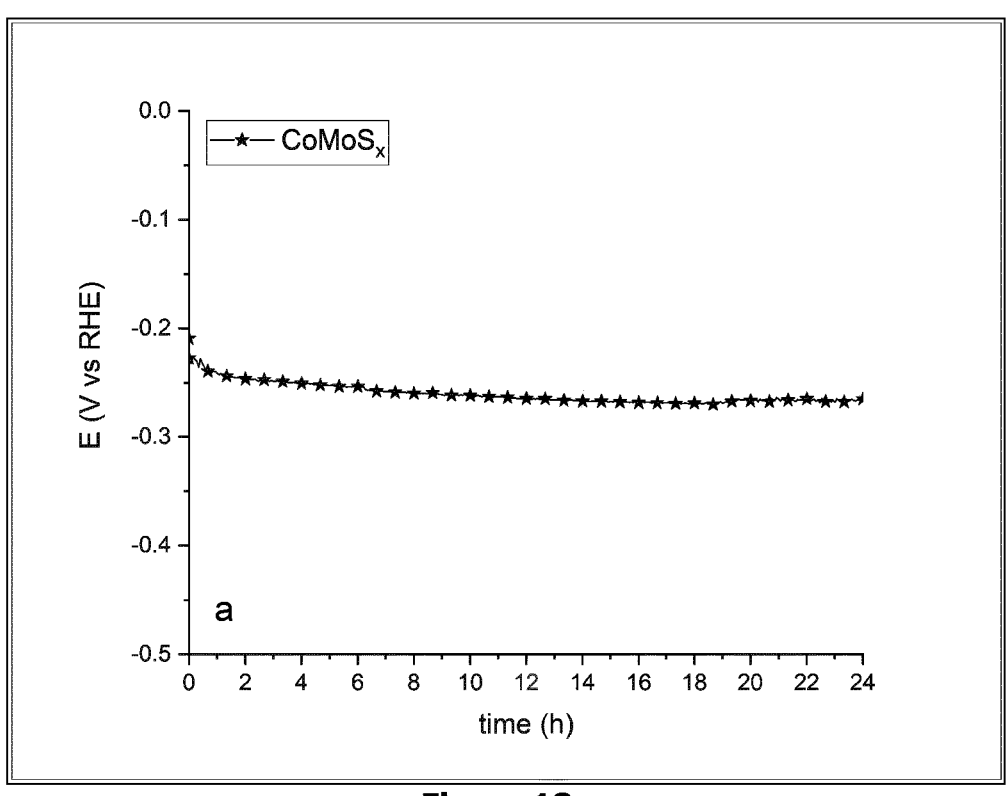
FIG. 18 shows the chronopotentiometric curves (stability test) of $CoMoS_x$ and $CoMoS_x$-P3HT (20:1) under $N_2$-saturated electrolyte (a, b) or $O_2$-saturated electrolyte (c, d).
Figure 18B:
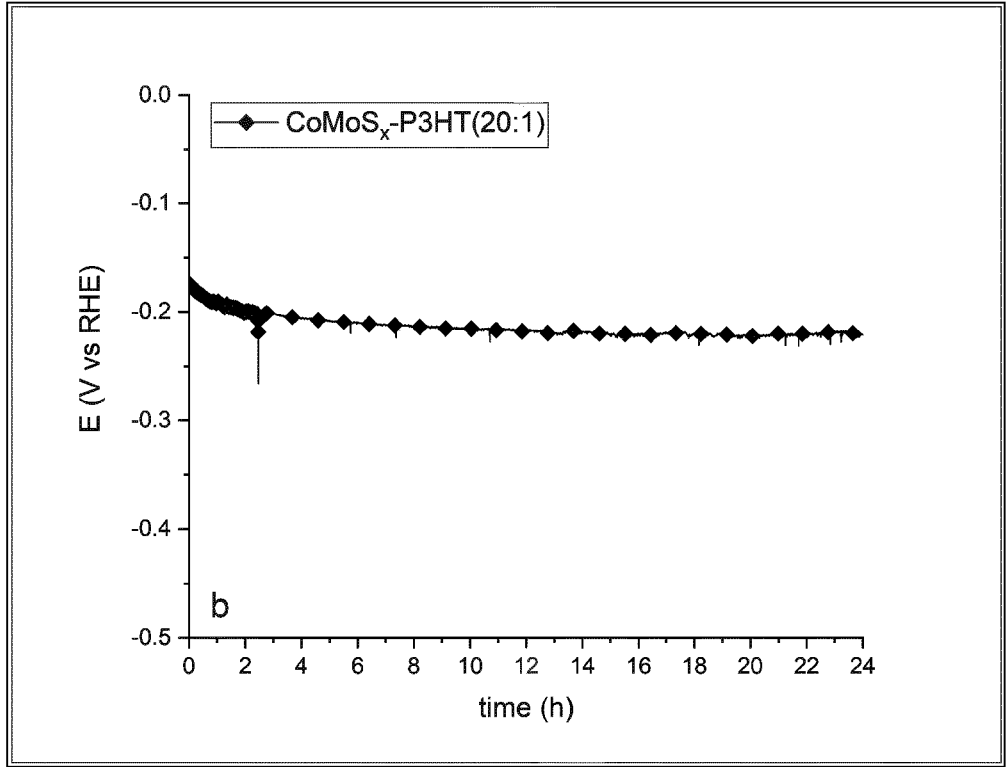
Figure 18C:
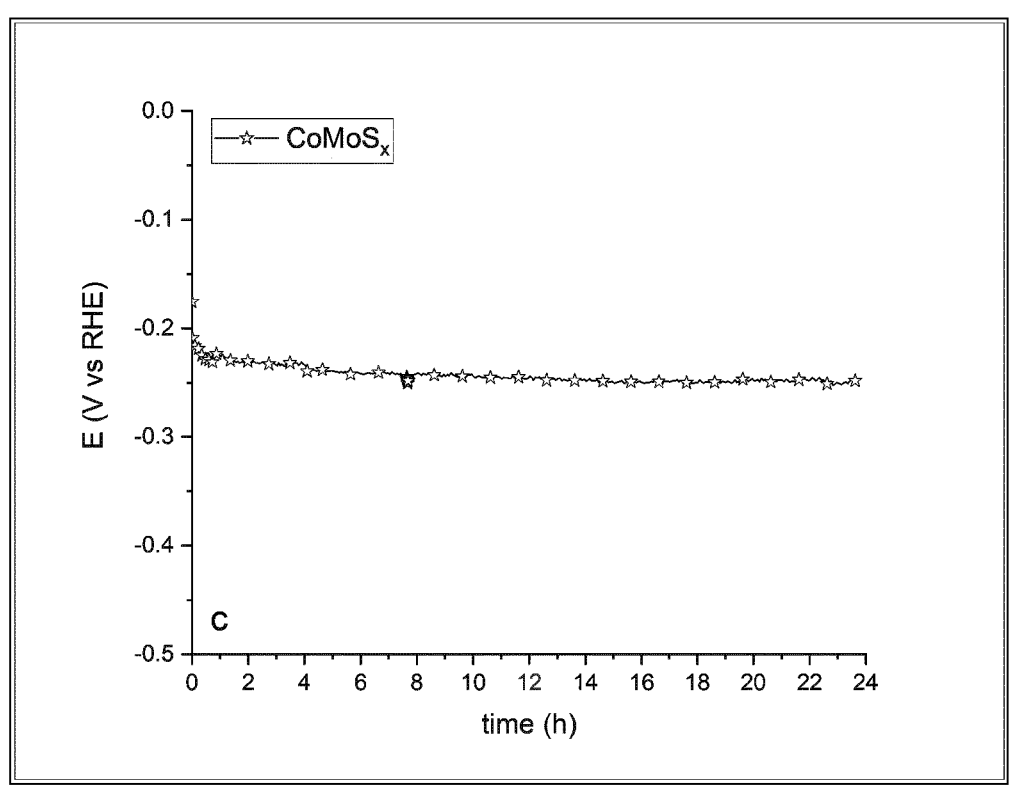
Figure 18D:
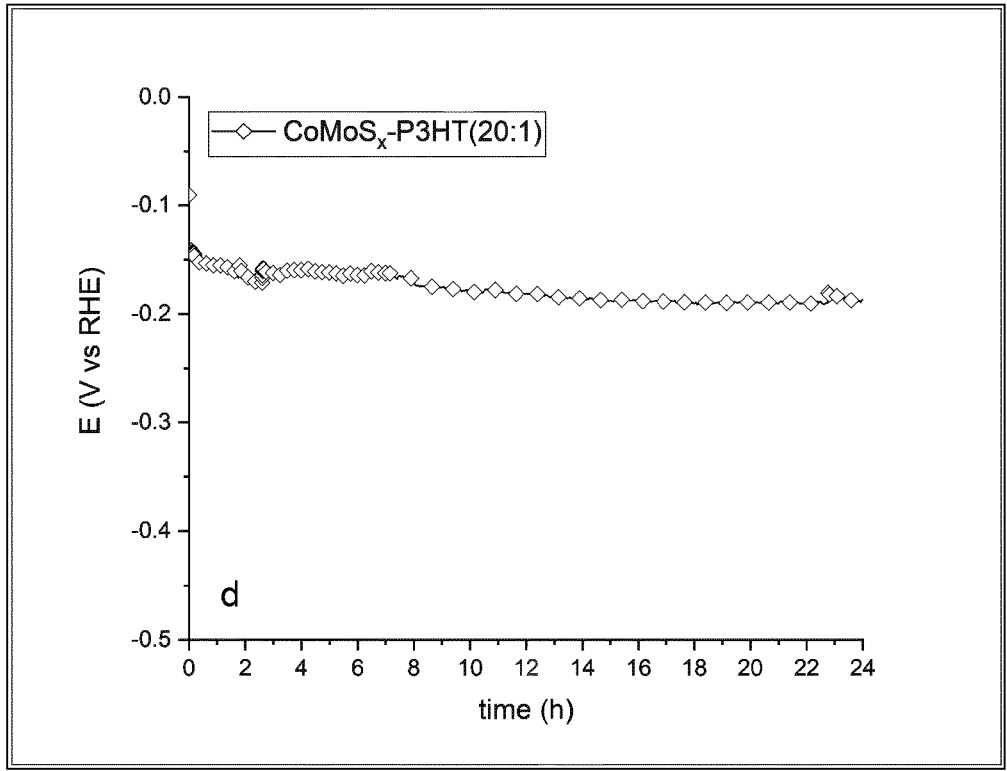

FIG. 15 shows the chronopotentiometric (CP) curves (stability test) of WS$_x$ and WS$_x$-P3HT under N$_2$-saturated electrolyte (a, b) or O$_2$-saturated electrolyte (c, d). Data extracted from CP curves are presented as columns graphs in FIG. 16 and FIG. 17 in order to evaluate the evolution of OP$_{10\ mA \cdot cm-2}$ during 24 hours operation. The potential E (V vs RHE) required to reach 10 mA·cm$^{-2}$ is increased similarly (~33 mV) for WS$_x$ and WS$_x$-P3HT (20:1) after 24 hours of electrolysis under N$_2$-saturated electrolyte. The potential E (V vs RHE) required to reach 10 mA-cm$^{-2}$ is increased by ~45 mV for WS$_x$ and by −15 mV for WS$_x$-P3HT (20:1) after 24 hours of electrolysis under O$_2$-saturated electrolyte. An increased stability is therefore observed for WS$_x$-P3HT (20:1) under oxygen atmosphere. Overpotential vs time (stability test) for WS$_x$ during 24 hours operation ($\Delta$OP$_{10\ mAcm-2}$/mV=OP$_{10\ mAcm-2}$ (t)/mV−OP$_{10\ mAcm-2}$(t$_0$)/mV) (data extracted from FIG. 15 (a, c)) is shown in FIG. 16. Overpotential vs time (stability test) for WS$_x$-P3HT during 24 hours operation ($\Delta$OP$_{10\ mAcm-2}$/mV=OP$_{10\ mAcm-2}$ (t)/mV−OP$_{10\ mAcm-2}$(t$_0$)/mV) (data extracted from FIG. 15 (b, d)) is shown in FIG. 17.

Figure 19:
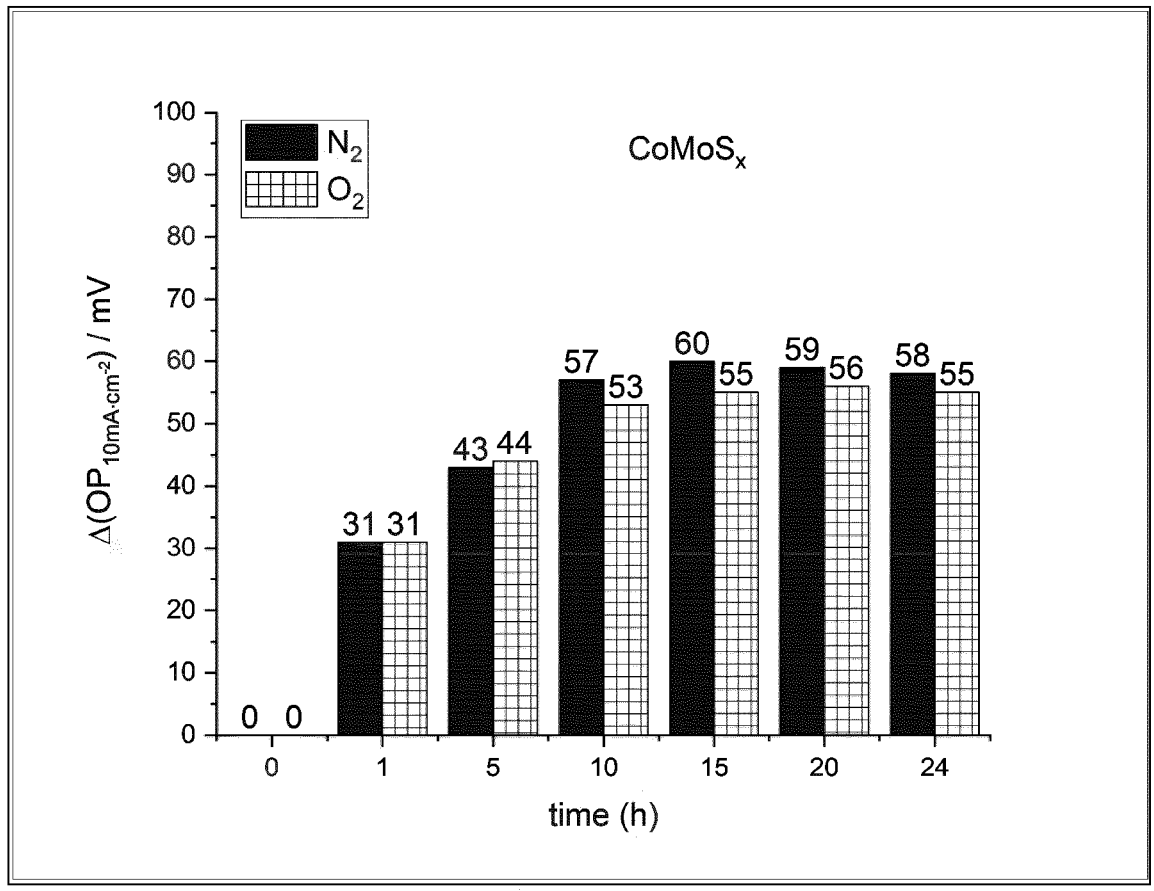
FIG. 19 shows the overpotential evolution (stability test) for $CoMoS_x$ during 24 hours operation ($\Delta OP_{10\ mAcm-2}$/ $mV=OP_{10\ mAcm-2}$ (t)/mV$-OP_{10\ mAcm-2}(t_0)$/mV) (data extracted from FIG. 18 (a, c))
Figure 20:
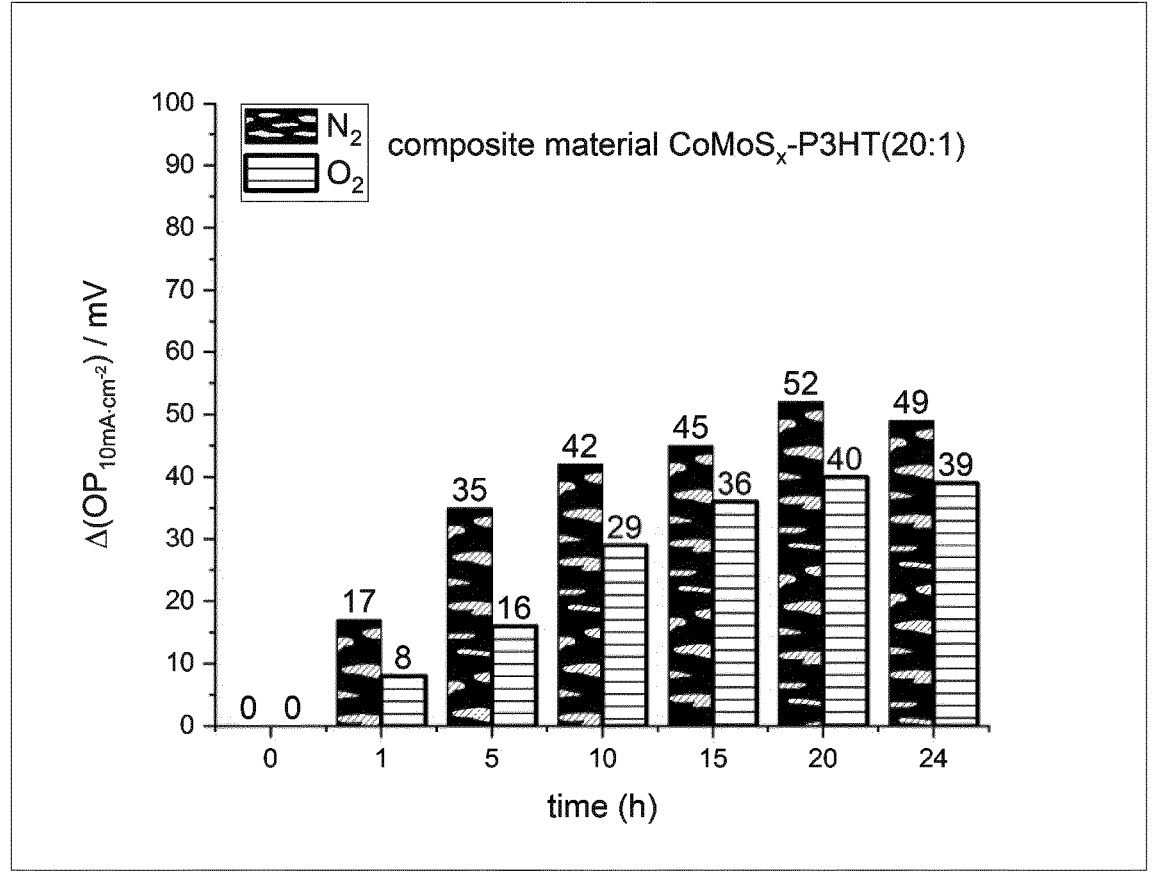
FIG. 20 shows the overpotential evolution (stability test) for $CoMoS_x$-P3HT (20:1) during 24 hours operation ($\Delta OP_{10\ mAcm-2}$/mV$=$ $OP_{10\ mAcm-2}$ (t)/mV$-OP_{10\ mAcm-2}(t_0)$/mV) (data extracted from FIG. 18 (b, d)).

FIG. 18 shows the chronopotentiometric (CP) curves (stability test) of CoMoS$_x$ and CoMoS$_x$-P3HT (20:1) under N$_2$-saturated electrolyte (a, b) or O$_2$-saturated electrolyte (c, d). Data extracted from CP curves are presented as columns graphs in FIG. 19 and FIG. 20 in order to evaluate the evolution of OP$_{10\ mA \cdot cm-2}$ during 24 hours operation. The potential E (V vs RHE) required to reach 10 mA-cm$^{-2}$ is increased by ~60 mV for CoMoS$_x$ and by ~50 mV CoMoS$_x$-P3HT (20:1) after 24 hours of electrolysis under N$_2$-saturated electrolyte. The potential E (V vs RHE) required to reach 10 mA-cm$^{-2}$ is increased by ~55 mV for CoMoS$_x$ and only by ~40 mV CoMoS$_x$-P3HT (20:1) after 24 hours of electrolysis under O$_2$-saturated electrolyte. An increased stability was therefore observed for CoMoS-P3HT (20:1) under oxygen atmosphere. Overpotential vs time (stability test) for FeMoS$_x$ during 24 hours operation ($\Delta$OP$_{10\ mAcm-2}$/mV=OP$_{10\ mAcm-2}$ (t)/mV−OP$_{10\ mAcm-2}$(t$_0$)/ mV) (data extracted from FIG. 18 (a, c)) is shown in FIG. 19 Overpotential vs time (stability test) for FeMoS$_x$-P3HT during 24 hours operation ($\Delta$OP$_{10\ mAcm-2}$/mV=OP$_{10\ mAcm-2}$ (t)/mV−OP$_{10\ mAcm-2}$(t$_0$)/mV) (data extracted from FIG. 18 (b, d)) is shown in FIG. 20.

Fabrication of Membrane-Electrodes Assembly (MEA) for PEM Electrolysis:

The membrane-electrode assembly (MEA) was prepared using Nafion® 212 membrane (50 μm thick) as polymer electrolyte membrane and iridium black as the anode catalyst. The composite material a-MoS$_x$-P3HT of the invention was used as the cathode catalyst. For the cathode preparation, the catalyst was mixed with carbon Vulcan XC72R (Cabot). Catalyst inks were prepared using an ethanol/water solution and Nafion® perfluorinated resin solution (5 wt % solution, Sigma-Aldrich). The catalyst ink solutions were sonicated for 1 hour using an ultrasonic bath prior deposition.

The anode catalyst ink was deposited onto a decal substrate (PTFE-coated fiberglass cloth, Plastic Elastomer) until the fixed catalyst loading was reached. The cathode catalyst ink was deposited onto an uncatalysed gas diffusion layer (GDL, Sigracet 39BC, SGL Group—The Carbon Company) to reach the fixed catalyst loading. The as-prepared electrode and the coated decal substrate were assembled by sandwiching the Nafion® 212 membrane and hot pressing at 120° C. for 1 min 30 s under 5 MPa. The anode catalyst was transferred onto one side of the Nafion® 212 membrane by peeling off the decal substrate after the hot-press stopped working.

Figure 4:
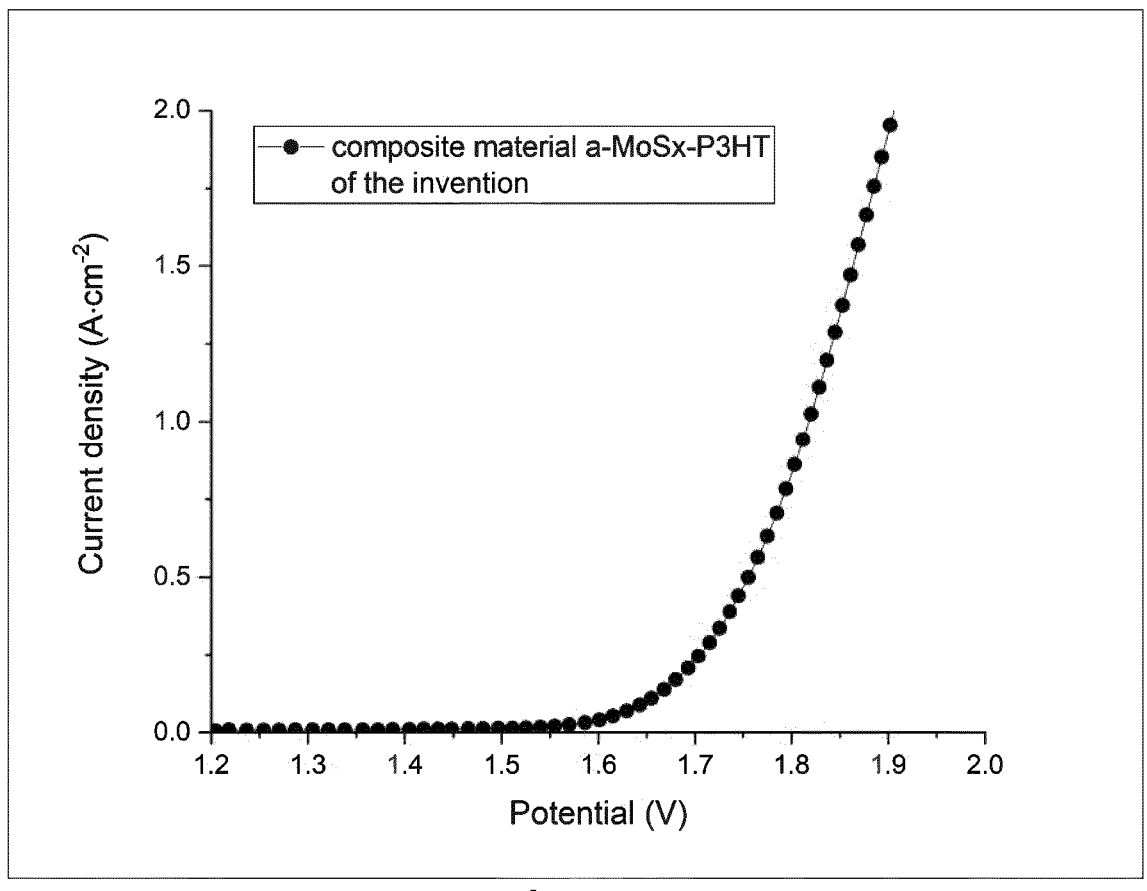
FIG. 4 studies the performance of $a-MoS_x$-P3HT in an electrochemical device (electrolyser), and shows the single cell polarization curve for proton-exchange membrane (PEM) electrolysis (at 80° C.) using Ir black/Nafion® NRE-212/$a-MoS_x$-P3HT as membrane-electrodes assembly (MEA).

The as-prepared MEA was further assembled in a single cell proton-exchange membrane (PEM) electrolyser. The polarization curve of the measured MEA is shown in FIG. 4. A notable electrochemical performance is obtained at 80° C., 1.75 V being required to reach 0.5 mA·cm$^{-2}$ and 1.83 V to reach 1 mA·cm$^{-2}$.

The invention claimed is:

1. A composite material made of:
   amorphous (bi)metal sulfide nanoparticles directly linked, through coordinate covalent bonds, to
   a sulfur-containing polymer,
   wherein the metal of the amorphous (bi)metal sulfide nanoparticles is selected from the group consisting of Mo, V, and W, and
   wherein the amorphous (bi)metal sulfide nanoparticles are made of (bi) metal sulfide clusters.

2. The composite material according to claim 1, wherein the metal(s) of the amorphous (bi)metal sulfide nanoparticles are selected from the group consisting of metal(s) of the columns 5 and 6 of the periodic table, optionally combined with another element selected from the group consisting of the columns 4 to 11 of the periodic table.

3. The composite material according to claim 2, wherein the metal(s) of the amorphous (bi)metal sulfide nanoparticles are in combination with another element selected from the group consisting of Mo, V, W, Ti, Cr, Mn, Fe, Co, Ni, Cu, Nb, and Ta.

4. The composite material according to claim 1, wherein the amorphous (bi)metal sulfide nanoparticles are amorphous single-metal sulfide nanoparticles, wherein the metal is selected from the group consisting of Mo and W.

5. The composite material according to claim 1, wherein the amorphous (bi)metal sulfide nanoparticles are amorphous bi-metal sulfide nanoparticles, wherein the metals of the amorphous bi-metal sulfide nanoparticles are different.

6. The composite material according to claim 1, wherein the sulfur-containing polymer is selected from the group consisting of polythiophene, poly(ethylenedioxythiophene), polyphenylene sulfide, and mixtures thereof.

7. The composite material according to claim 1, wherein the sulfur-containing polymer is poly(3-hexylthiophene-2, 5-diyl) (P3HT).

8. The composite material according to claim 1, wherein the sulfur-containing polymer has a number average molecular weight ranging from 5,000 to 100,000 $g \cdot mol^{-1}$.

9. The composite material according to claim 1, wherein the number of (bi)metal sulfide clusters ranges from 2 to 40.

10. The composite material according to claim 9, wherein the number-based particle size Dn,90 of an amorphous (bi)metal sulfide cluster ranges from 0.1 to 2 nm.

11. The composite material according to claim 1, wherein the number-based size Dn,90 of the composite material ranges from 1 to 100 nm.

12. The composite material according to claim 1, wherein the amount of metal in the amorphous (bi)metal sulfide nanoparticles represents from 20 to 75 wt %.

13. The composite material according to claim 1, wherein the amount of S in the amorphous (bi)metal sulfide nanoparticles represents from 25 to 80 wt %.

14. The composite material according to claim 1, wherein the mass ratio between the amorphous (bi)metal sulfide nanoparticles and the sulfur-containing polymer ranges from 1:1 and 100:1.

15. A process for the preparation of the composite material according to claim 1, comprising the steps of:

(i) preparing amorphous (bi)metal sulfide nanoparticles; and (ii) under stirring, dispersing the amorphous (bi)metal sulfide nanoparticles obtained in step (i) in a solution of a sulfur-containing polymer, in order to form coordinate covalent bonds between the sulfur-containing polymer and the metal ions of the amorphous (bi)metal sulfide nanoparticles obtained in step (i).

16. The process according to claim 15, wherein the amorphous (bi)metal sulfide nanoparticles are prepared in step (i) by reaction of a metal salt with a sulfur-containing compound, and then heating the amorphous (bi)metal sulfide nanoparticles.

17. The process according to claim 15, wherein the amorphous (bi)metal sulfide nanoparticles are prepared in step (i) by oxidation-reduction reaction of thiometallate ions with an oxidizing agent selected from the group consisting of sodium persulfate, potassium persulfate, sodium permanganate, potassium permanganate, sodium percarbonate, sodium dichromate, potassium dichromate, ceric nitrate.

18. The process according to claim 15, wherein the concentration of the solution of sulfur-containing polymer of step (ii) ranges from 0.05 to 1 $g \cdot mol^{-1}$.

19. The process according to claim 15, further comprising a step (iii) of washing the sulfur-containing polymer directly linked through coordinate covalent bonds to the amorphous (bi)metal sulfide obtained in step (ii) with a solvent selected from the group consisting of water, diethyl ether, alcohols in $C_1$-$C_6$, and their mixtures.

20. A method of hydrogen production comprising depositing the composite material according to claim 1, as a catalyst, onto an electrode in contact with water, and applying an electric current to the electrode.

21. A proton-exchange membrane (PEM) electrolyser comprising the composite material according to claim 1.

22. A photoelectrochemical cell comprising the composite material according to claim 1.

\* \* \* \* \*